(12) United States Patent
Yonezawa et al.

(10) Patent No.: US 12,028,018 B2
(45) Date of Patent: Jul. 2, 2024

(54) ELECTRONIC APPARATUS FOR DETERMINING CORRESPONDENCE BETWEEN DEVICES AND POSITIONS AT WHICH DEVICES ARE LOCATED USING PROPAGATION CHARACTERISTIC OF WIRELESS COMMUNICATION BETWEEN DEVICES, AND METHOD, AND ELECTRONIC SYSTEM FOR SAME

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yuki Yonezawa, Kanagawa (JP); Takafumi Sakamoto, Tokyo (JP); Tomohiro Tobari, Kanagawa (JP); Takanori Kouta, Tokyo (JP)

(73) Assignees: KABUSHIKI KAISHA TOSHIBA, Tokyo (JP); TOSHIBA ENERGY SYSTEMS & SOLUTIONS CORPORATION, Kanagawa (JP)

( * ) Notice: Subject to any disclaimer, the term of this patent is extended or adjusted under 35 U.S.C. 154(b) by 624 days.

(21) Appl. No.: 17/188,053

(22) Filed: Mar. 1, 2021

(65) Prior Publication Data
US 2021/0194423 A1 Jun. 24, 2021

Related U.S. Application Data

(63) Continuation of application No. PCT/JP2019/024166, filed on Jun. 18, 2019.

(51) Int. Cl.
*H02S 50/00* (2014.01)
*G01S 5/02* (2010.01)
(Continued)

(52) U.S. Cl.
CPC ............ *H02S 50/00* (2013.01); *G01S 5/0278* (2013.01); *G01S 5/0284* (2013.01); *G01S 5/14* (2013.01); *H04B 17/318* (2015.01)

(58) Field of Classification Search
CPC .. G01S 5/0284; G01S 5/0289; G01S 5/02524; G01S 5/02521; G01S 11/02
(Continued)

(56) References Cited

U.S. PATENT DOCUMENTS 7,092,726 B2 * 8/2006 Shi .................. G01S 5/0289
342/451
8,237,612 B2 * 8/2012 Lin .................. G01S 5/02529
342/451
(Continued)

FOREIGN PATENT DOCUMENTS

CN 107923970 A 4/2018
JP 2008224489 A 9/2008
(Continued)

OTHER PUBLICATIONS

DuyBach Bui and Daeyoung Kim, "A localization algorithm with learning-based distances," Proceedings. 14th International Conference on Computer Communications and Networks, 2005. ICCCN 2005., San Diego, CA, USA, 2005, pp. 569-574. (Year: 2005).*
(Continued)

*Primary Examiner* — Bo Fan
(74) *Attorney, Agent, or Firm* — Holtz, Holtz & Volek PC

(57) ABSTRACT

According to one embodiment, an electronic apparatus includes a processor. The processor is configured to acquire n installation positions where first to n-th pieces of equipment are installed, receive a propagation characteristic related to the first to n-th pieces of equipment, and estimate, by an algorithm, a combination or the first to n-th pieces of equipment and each of the n installation positions based on
(Continued)

a propagation characteristic related to the first to n-th pieces of equipment. An initial value of the algorithm is generated based on an arrangement of the n installation positions and an arrangement of the first to n-th pieces of equipment determined based on a propagation characteristic related to the first to n-th pieces of equipment.

13 Claims, 15 Drawing Sheets

(51) Int. Cl.
　　　*G01S 5/14*　　　(2006.01)
　　　*H04B 17/318*　　(2015.01)
(58) Field of Classification Search
　　　USPC .................... 342/450, 451, 357.21; 455/446
　　　See application file for complete search history.

(56) References Cited

U.S. PATENT DOCUMENTS

| | | | | |
|---|---|---|---|---|
| 9,807,849 | B2* | 10/2017 | Bhatkar | H05B 47/115 |
| 2002/0122003 | A1* | 9/2002 | Patwari | G01S 11/02 |
| | | | | 342/450 |
| 2004/0236547 | A1* | 11/2004 | Rappaport | G06F 30/13 |
| | | | | 703/2 |
| 2015/0105086 | A1* | 4/2015 | Thiel | H04W 64/00 |
| | | | | 455/446 |
| 2016/0337888 | A1* | 11/2016 | Zhang | G06T 15/06 |
| 2017/0041740 | A1* | 2/2017 | Kanayama | H04B 17/318 |
| 2017/0052247 | A1* | 2/2017 | Kong | G01S 5/0289 |
| 2018/0041985 | A1* | 2/2018 | Davaadorj | H04W 64/003 |
| 2018/0234937 | A1 | 8/2018 | Yoon et al. | |
| 2019/0095852 | A1* | 3/2019 | Sanjay | G06Q 10/087 |
| 2019/0274116 | A1 | 9/2019 | Hayashikoshi et al. | |
| 2019/0383896 | A1* | 12/2019 | Han | G01S 5/02525 |
| 2021/0190927 | A1 | 6/2021 | Sakamoto et al. | |

FOREIGN PATENT DOCUMENTS

| | | |
|---|---|---|
| JP | 2012173070 A | 9/2012 |
| JP | 2017032469 A | 2/2017 |
| JP | 2017181287 A | 10/2017 |
| WO | 2018069208 A1 | 4/2018 |
| WO | 2018123970 A1 | 7/2018 |

OTHER PUBLICATIONS

Related U.S. Appl. No. 17/194,061; First Named Inventor: Takafumi Sakamoto; Title: "Electronic Apparatus, Method, and Electronic System"; filed Mar. 5, 2021.

Sakagami, et al., "On the Approximation Algorithm for Traveling Salesman Problem", Research Reports of the Faculty of Engineering, Mie University (vol. 25), 2000, pp. 81-96, http://hdl.handle.net/10076/4091.

Yonezawa, et al., "BluMatch: Wireless Equipment Self-Positioning Estimation Without Using Anchor Nodes", IPSJ Symposium Series: Multimedia, Distributed, Cooperative and Mobile Symposium (DICOMO2016) (vol. 2016), 2016, pp. 123-128.

Bui, et al., "A localization algorithm with learning-based distances", Proceedings. 14th International Conference on Computer Communications and Networks, 2005. pp. 569-574.

Office Action (Non-Final Rejection) dated Sep. 14, 2023, issued in related U.S. Appl. No. 17/188,053.

Office Action (Non-Final Rejection) dated Aug. 28, 2023, issued in related U.S. Appl. No. 17/194,061.

* cited by examiner

|    | D2  | D3  | D4  | D5  | D6  | D7  | D8  |
|----|-----|-----|-----|-----|-----|-----|-----|
| D1 | -50 | -51 | -56 | -58 | -60 | -78 | -75 |

FIG. 9

|    | D1  | D2  | D3  | D4  | D5  | D6  | D7  | D8  |       |
|----|-----|-----|-----|-----|-----|-----|-----|-----|-------|
| D1 |     | -50 | -51 | -56 | -58 | -60 | -78 | -75 | ~101a |
| D2 | -51 |     | -55 | -53 | -67 | -60 | -80 | -77 | ~101b |
| D3 | -52 | -55 |     | -57 | -56 | -67 | -69 | -70 | ~101c |
| D4 | -59 | -61 | -50 |     | -57 | -55 | -62 | -65 | ~101d |
| D5 | -70 | -66 | -56 | -55 |     | -51 | -54 | -58 | ~101e |
| D6 | -73 | -69 | -67 | -65 | -55 |     | -54 | -53 | ~101f |
| D7 | -75 | -79 | -61 | -59 | -55 | -53 |     | -51 | ~101g |
| D8 | -76 | -73 | -62 | -63 | -55 | -58 | -51 |     | ~101h |

FIG. 10

| Set position ID | X coordinate | Y coordinate |
|---|---|---|
| P1 | 1 | 2 |
| P2 | 1 | 1 |
| P3 | 2 | 2 |
| P4 | 2 | 1 |
| P5 | 3 | 2 |
| P6 | 3 | 1 |
| P7 | 4 | 2 |
| P8 | 4 | 1 |

File that defines coordinates

[{"x":1 "y":2},
{"x":1 "y":1},
{"x":2 "y":2},
{"x":2 "y":1},
{"x":3 "y":2},
{"x":3 "y":1},
{"x":4 "y":2},
{"x":4 "y":1}]

F I G. 13

|   | 1 | 2 | 3 | 4 | 5 | 6 | 7 | 8 |
|---|---|---|---|---|---|---|---|---|
| A |   |   |    |    |    |    |   |   |
| B |   |   | P1 | P3 | P5 | P7 |   |   |
| C |   |   |    |    |    |    |   |   |
| D |   |   | P2 | P4 | P6 | P8 |   |   |
| E |   |   |    |    |    |    |   |   |
| F |   |   |    |    |    |    |   |   |
| G |   |   |    |    |    |    |   |   |

F I G. 14

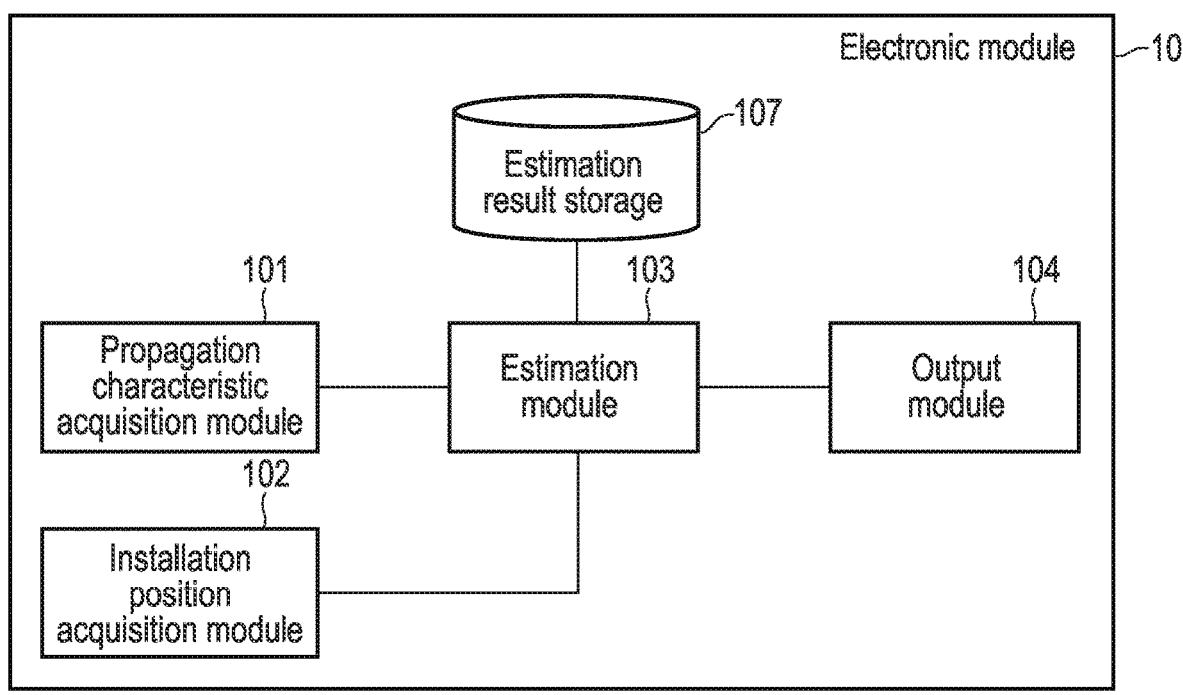
F I G. 24

ELECTRONIC APPARATUS FOR DETERMINING CORRESPONDENCE BETWEEN DEVICES AND POSITIONS AT WHICH DEVICES ARE LOCATED USING PROPAGATION CHARACTERISTIC OF WIRELESS COMMUNICATION BETWEEN DEVICES, AND METHOD, AND ELECTRONIC SYSTEM FOR SAME

CROSS-REFERENCE TO RELATED APPLICATIONS

This application is a Continuation Application of PCT Application No. PCT/JP2019/024166, filed Jun. 18, 2019, the entire contents of which are incorporated herein by reference.

FIELD

Embodiments described herein relate generally to an electronic apparatus, a method, and an electronic system.

BACKGROUND

In recent years, it is known to measure propagation characteristics (e.g., RSSI) among a plurality of wireless machines and estimate the position where each of the plurality of wireless machines is installed.

However, when the number of wireless machines increases, the calculation amount for estimating the position where each of the plurality of wireless machines is installed becomes enormous, and efficient estimation cannot be performed.

BRIEF DESCRIPTION OF THE DRAWINGS

FIG. 9 shows an example of a data structure of characteristic information acquired in one wireless machine.

FIG. 10 shows an example of a data structure of characteristic information acquired in the electronic apparatus.

FIG. 13 is a view showing an example of a file in which a coordinate value of each of a plurality of installation positions is defined.

FIG. 14 is a view shewing an example of an input, screen for inputting position information.

FIG. 24 is a block diagram showing an example of a functional configuration of an electronic apparatus according to a third embodiment.

DETAILED DESCRIPTION

In general, according to one embodiment, an electronic apparatus includes a processor. The processor is configured to acquire n installation positions where first to n-th (n is an integer equal to or greater than 2) pieces or equipment are installed, receive a propagation characteristic related to the first to n-th pieces of equipment, and estimate, by an algorithm, a combination of the first to n-th pieces of equipment and each of the n installation positions based on a propagation characteristic related to the first to n-th pieces of equipment. An initial value of the algorithm is generated based on an arrangement of the n installation positions and an arrangement of the first, to n-th pieces of equipment determined based on a propagation characteristic related to the first to n-th pieces of equipment.

Various embodiments will be described hereinafter with reference to the accompanying drawings.

First Embodiment

First, the first embodiment will be described. The electronic apparatus according to the present embodiment is used, for example, in a case where a plurality of wireless machines are installed at a plurality of predetermined installation positions, to estimate the position (i.e., combination of each of the plurality of installation positions and each of the plurality of wireless machines) where each of the plurality of wireless machines is installed from among the plurality of installation positions.

Hereinafter, an example of the usage mode of the electronic apparatus according to the present embodiment, will be specifically described with reference to FIG. 1. Here, a case where the electronic apparatus according to the present embodiment is used in a photovoltaic power generation system will be described.

Figure 1:
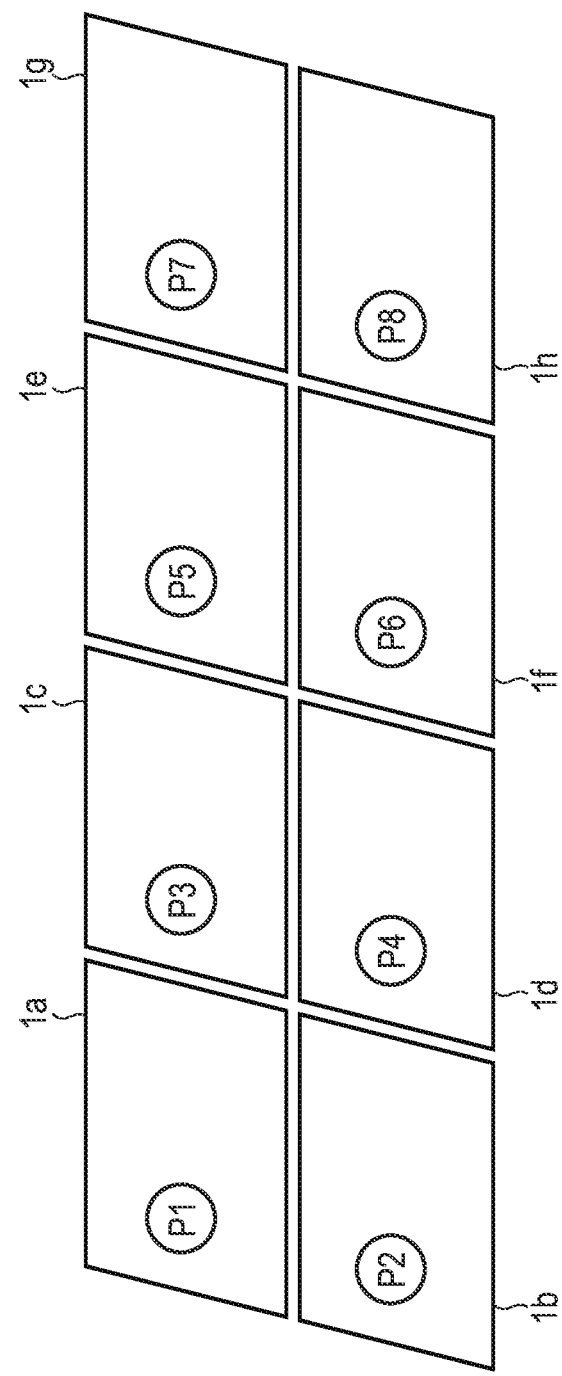
FIG. 1 is a view for specifically explaining an example of a usage mode of an electronic apparatus according to a first embodiment.

In the example shown in FIG. 1, the photovoltaic power generation system includes a plurality of solar panels 1a to 1h. In the photovoltaic power generation system, each of the solar panels 1a to 1h converts sunlight (light energy) into electric power (i.e., power generation) and supplies the electric power to the outside via a microinverter, for example. Note that a computer unit is installed on the back surface of each of the solar panels 1a to 1h.

Figure 2:
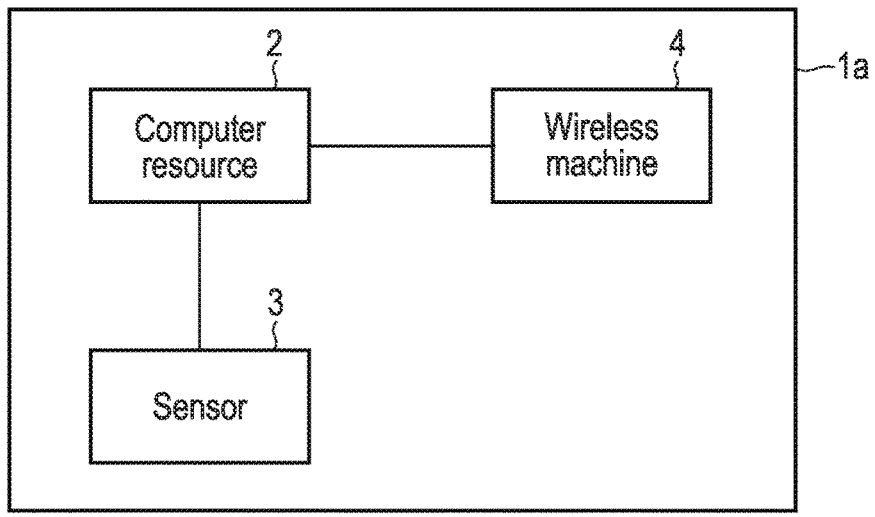
FIG. 2 is a diagram showing an example of a configuration of a computer unit installed in a solar panel.

FIG. 2 shows an example of the configuration of a computer unit installed on the back surface of the solar panel 1a. As shown in FIG. 2, a computer resource 2, a sensor 3, and a wireless machine 4 are installed in the computer unit.

The computer resource 2 includes, for example, a CPU and a storage device (memory). The sensor 3 includes a power generation amount acquisition sensor that acquires the power generation amount in the solar panel 1a, for example. Note that the sensor 3 may further include an illuminance sensor and a temperature sensor. The wireless machine 4 transmits sensing information (e.g., power generation amount) acquired by the sensor 3, for example, to an external server device or the like.

Note that the computer unit has, for example, a housing, and the computer resource 2, the sensor 3, and the wireless machine 4 are arranged in the housing. The microinverter described above or the like may further be arranged inside this housing (computer unit).

While the computer unit installed in the solar panel 1a has been described here, the computer units installed in the other solar panels 1b to 1h have the same configuration. Note that positions P1 to P8 shown in FIG. 1 indicate the position of the (computer unit installed in each of the) solar panels 1a to 1h described above.

Figure 3:
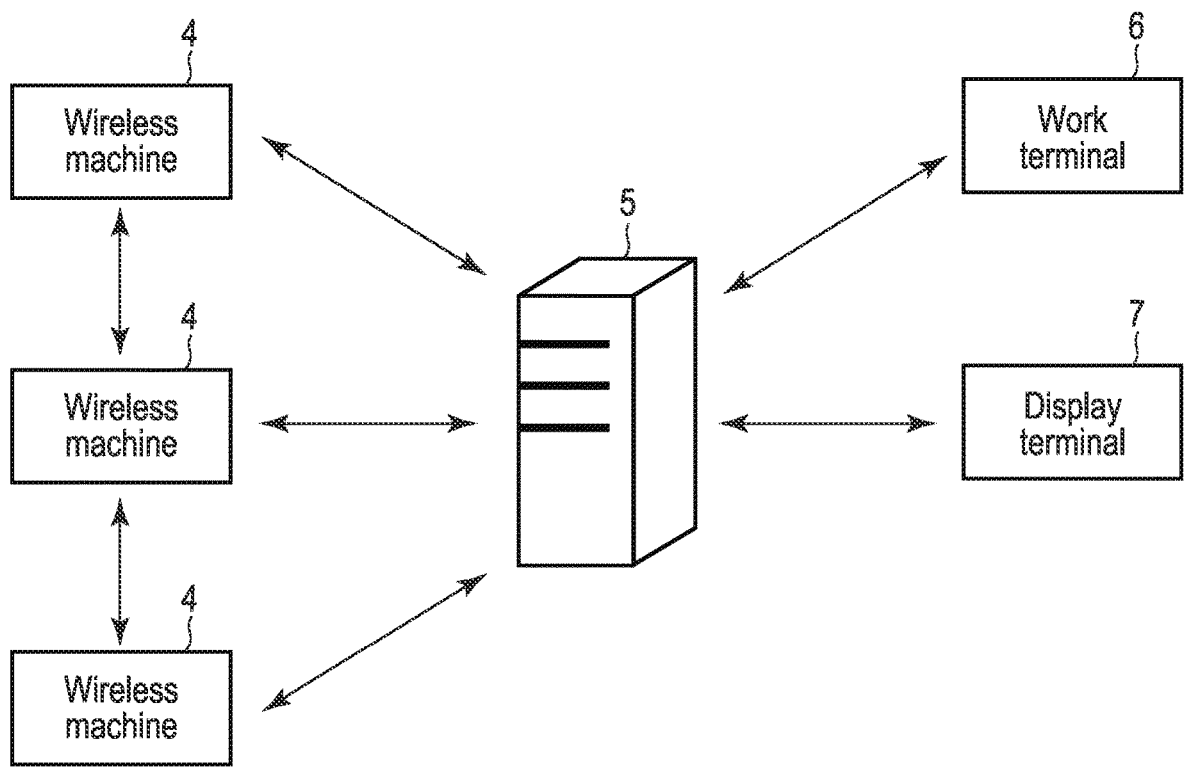
FIG. 3 is a diagram showing an example of a network configuration of a photovoltaic power generation system.

Next, FIG. 3 shows an example of the network configuration of the photovoltaic power generation system. According to the network configuration shown in FIG. 3, for example, a server device 5 can collect, for example, the power generation amount as sensing information from each computer unit (wireless machine 4) installed in each of the plurality of solar panels 1a to 1h, and monitor the state of each of the solar panels 1a to 1h (operation status, failure, or the like) based on the collected power generation amount. Although not shown in FIG. 3, the collection of the power generation amount in each of the solar panels 1a to 1h in the server device 5 may be performed via an aggregation device arranged between the plurality of wireless machines 4 and the server device 5, for example.

Note that the server device 5 is communicably connected with, for example, a work terminal 6 used by a worker performing work at a site, a display terminal 7 used by a user of the photovoltaic power generation system, or the like. According to this, it is possible to display the state of each of the solar panels 1a to 1h described above on the work terminal 6, the display terminal 7, or the like.

Figure 4:
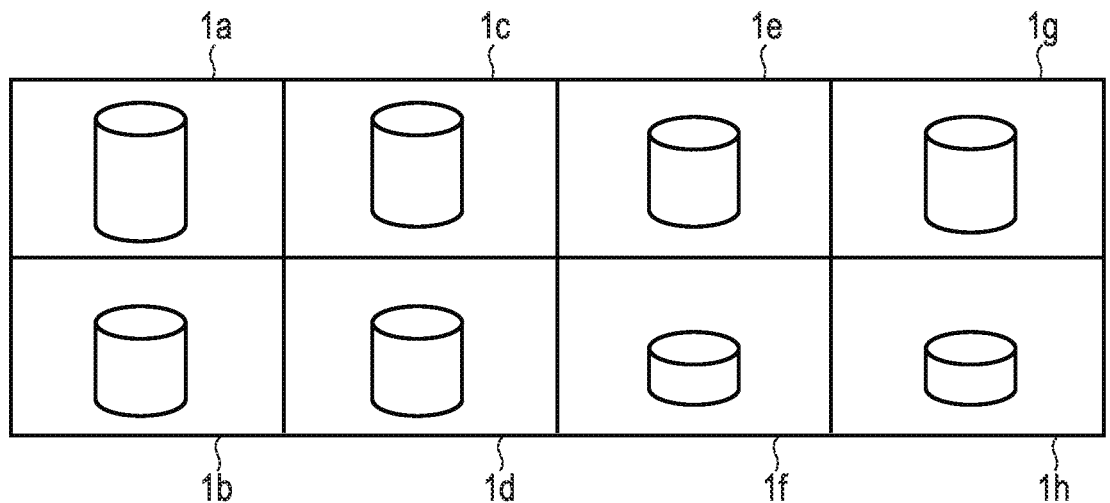
FIG. 4 is a view showing an example of a screen of a work terminal or a display terminal when a state of each of solar panels is displayed.

FIG. 4 shows an example of the screen of the work terminal or the display terminal 7 when the state of each of the solar panels 1a to 1h is displayed. By viewing a screen as shown in FIG. 4, the worker or the user can confirm the state (e.g., power generation amount) of each of the solar panels 1a to 1h.

In the case of monitoring (displaying the screen shown in FIG. 4) the state of each of the plurality of solar panels 1a to 1h based on the power generation amount collected from each of the plurality of solar panels 1a to 1h as described above, it is necessary to discriminate as to which solar panel the power generation amount transmitted from each wireless machine 4 is of.

Here, each wireless machine 4 is assigned with an identifier (hereinafter referred to as a wireless machine ID) for identifying the wireless machine 4, and when the wireless machine ID is transmitted from the wireless machine 4 together with the power generation amount, it is possible to specify the wireless machine 4 having transmitted the power generation amount.

However, in a case where the correspondence relationship between the (positions P1 to P8 of the) plurality of solar panels 1a to 1h and the (wireless machine IDs assigned to the) plurality of wireless machines 4 is unknown, even if a wireless machine ID is received, it is impossible to specify the solar panels (i.e., solar panel in which the wireless machine A is installed) corresponding to the power generation amount transmitted by the wireless machines 4 assigned with the wireless machine ID.

Therefore, it is conceivable to register in advance the correspondence relationship (combination) between the solar panel end the wireless machine ID, but in an environment where a large number of solar panels are arranged, for example, it is very complicated for a worker to perform installation work of the wireless machine 4 while registering the wireless machine ID assigned to the wireless machine 4. It is also difficult to confirm and register the wireless machine ID assigned to the wireless machine 4 after the wireless machine 4 is installed on each of the plurality of solar panels 1a to 1h.

Therefore, the electronic apparatus according to the present embodiment is used to estimate combination of each of the plurality of the positions P1 to P8 and each of the plurality of wireless machines 4 (i.e., wireless machine 4 installed at each of the positions P1 to P8) in a situation where it is known as to the positions P1 to P8 where the solar panels 1a to 1h (plurality of wireless machines 4) are installed as described above, but it is unknown as to which wireless machine 4 is installed at each of the positions P1 to P8 (i.e., correspondence between the positions P1 to P8 and the plurality of wireless machines 4).

While an example in which the electronic apparatus according to the present embodiment is used in a photovoltaic power generation system has been described here, the electronic apparatus according to the present embodiment may be used In a lighting equipment system, for example.

Figure 5:
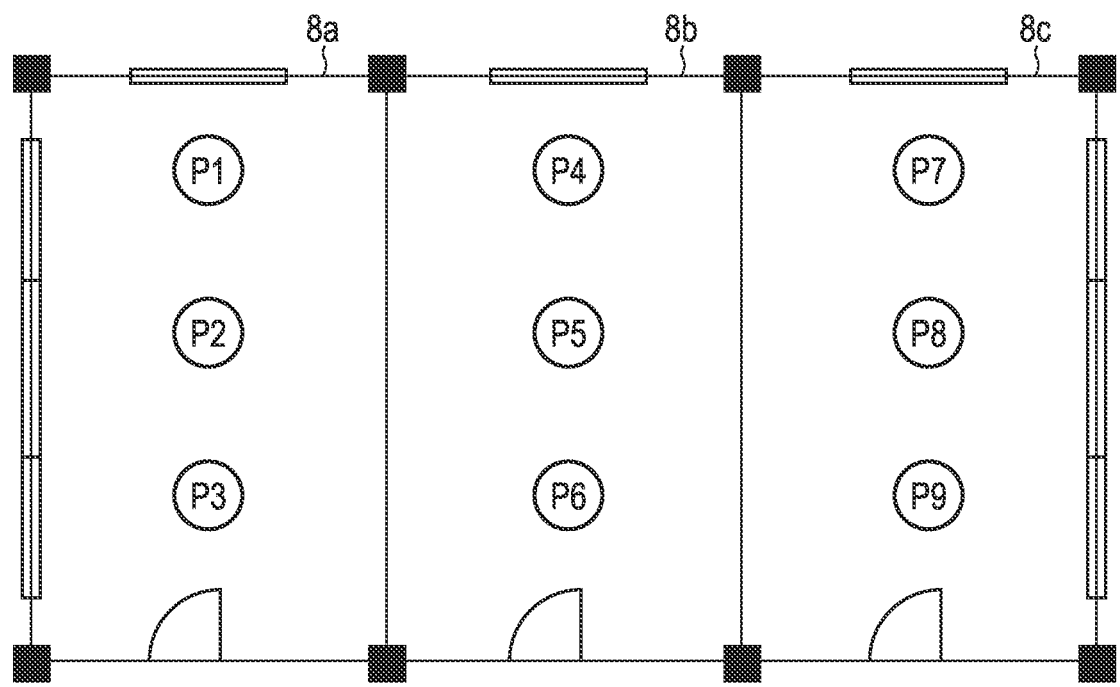
FIG. 5 is a view for specifically explaining another example of a usage mode of the electronic apparatus.

FIG. 5 shows a plurality of rooms 8a to 8c and positions P1 to P9) of lighting equipment arranged in each of the rooms 8a to 8c. In the example shown in FIG. 5, the lighting equipment is arranged at each of the positions P1 to P3 of the room 8a, the lighting equipment is arranged at each of the positions P4 to P6 of the room 8b, and the lighting equipment is arranged at each of the positions P7 to P9 of the room 8c.

In the lighting equipment system, for example, it is assumed that the wireless machine 4 (not illustrated) described above is installed in the lighting equipment arranged in each of the rooms 8a to 8c. According to this, it is possible to control (remotely operate), via the wireless machine 4, the power on/off of the lighting equipment in which the wireless machine 4 is installed.

Here, for example, when controlling only the lighting equipment installed in the room 8a, it is necessary to transmit a control signal to the wireless machine 4 installed in the positions P1 to P3 of the room 8a. The same applies to the case of controlling lighting equipment Installed in the other room 8b or 8c.

However, when the correspondence relationship between the (arrangement positions P1 to P9 of) lighting equipment and the (wireless machine ID assigned to) wireless machine 4 is unknown as described above, it is not possible to discriminate the wireless machine 4 to which the control signal should be transmitted when controlling a specific piece of lighting equipment.

The electronic apparatus according to the present embodiment can also be used to estimate the combination of each of the plurality of positions P1 to P9 and each of the plurality of wireless machines 4 in such a lighting equipment system.

Note that in addition to the above, the present embodiment can also be applied to, for example, a case of installing the wireless machine 4 in a plurality of air conditioners in an air conditioning system, a case of installing the wireless machine 4 in various facilities (air conditioners, motors, inverters, and the like) of trains and the like, and other cases.

Hereinafter, the electronic apparatus according to the present embodiment will be described in detail. Note that the electronic apparatus according to the present embodiment will be described as a device separate from the server, device 5, the work terminal 6, and the like, but may be incorporated in the server device 5 or the work terminal 6.

Figure 6:
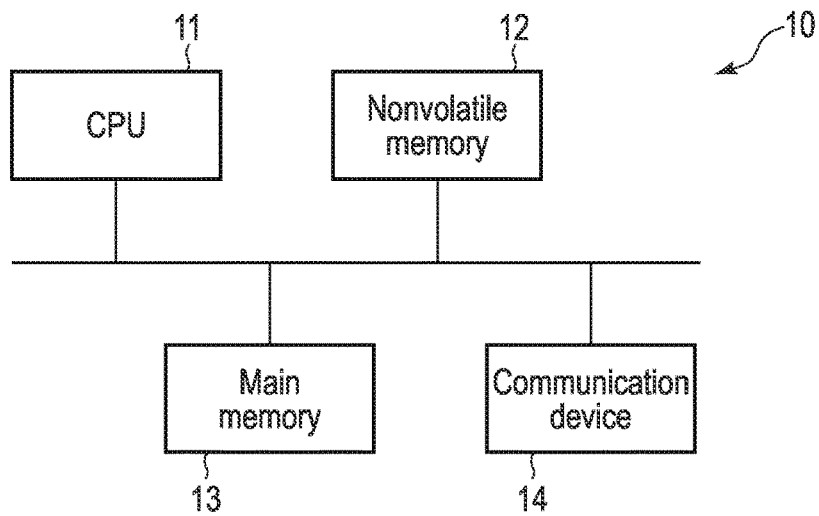
FIG. 6 is a diagram showing an example of a hardware configuration of the electronic apparatus.

FIG. 6 is a diagram showing an example of a hardware configuration of the electronic apparatus according to the present embodiment. As shown in FIG. 6, an electronic apparatus 10 includes a CPU 11, a nonvolatile memory 12, a main memory 13, and a communication device 14.

The CPU 11 is a hardware processor that controls the operation of each component in the electronic apparatus 10. The CPU 11 executes a program loaded from the nonvolatile memory 12, which is a storage device, to the main memory 13.

The communication device 14 is a device configured to execute wireless communication with external devices such as the plurality of wireless machines 4, for example.

Note that although only the nonvolatile memory 12 and the main memory 13 are shown in FIG. 6, the electronic apparatus 10 may include other storage devices such as a hard disk drive (HDD) and a solid state drive (SSD).

Although omitted in FIG. 6, the electronic apparatus 10 may further include an input device such as a mouse or a keyboard, and a display device such as a display. The electronic apparatus 10 may include a touch screen display or the like as an input device and a display device.

Figure 7:
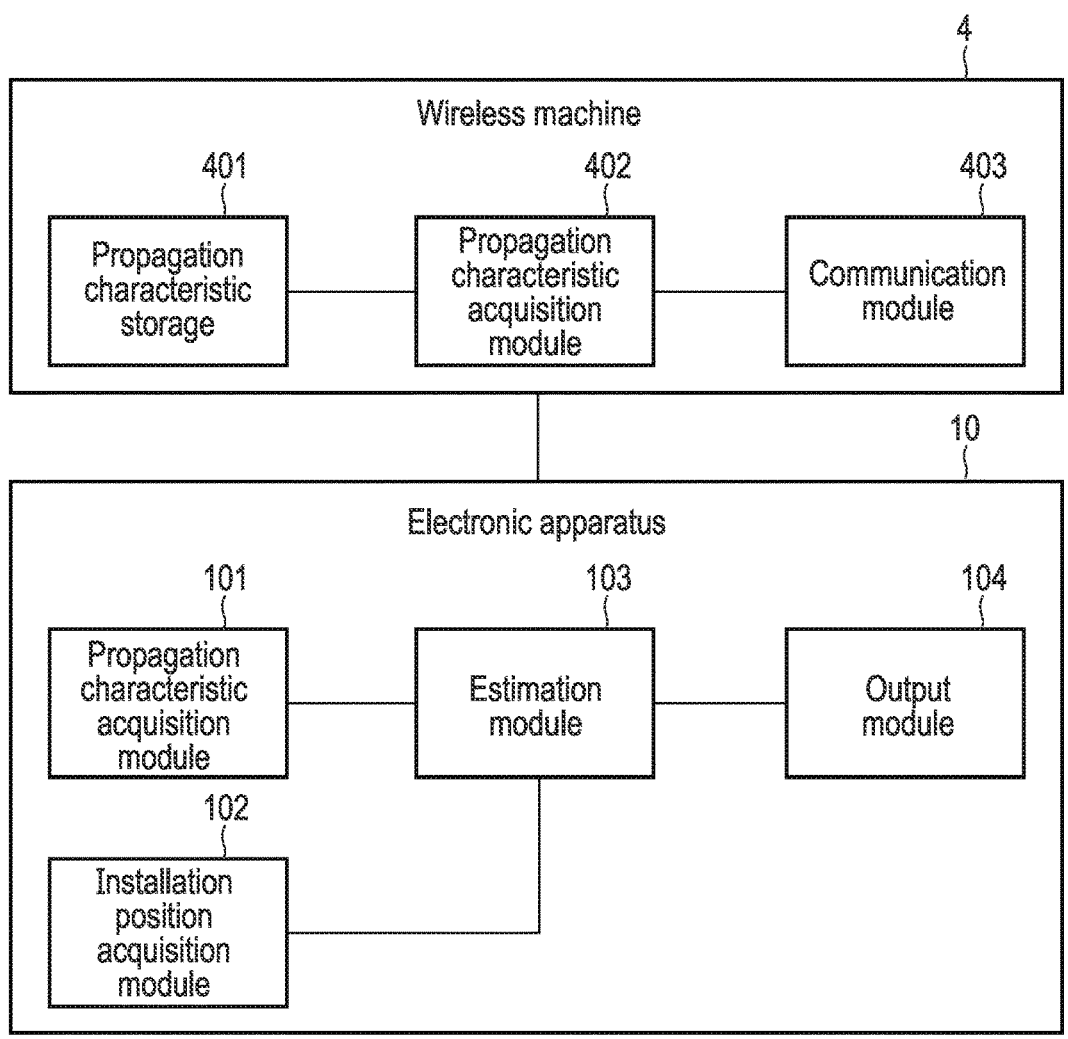
FIG. 7 is a block diagram showing an example of a functional configuration of a wireless machine and the electronic apparatus.

FIG. 7 is a block diagram showing an example of the functional configuration of the wireless machine 4 and the electronic apparatus 10. Note that the wireless machine 4 and the electronic apparatus 10 are communicably connected.

The wireless machine 4 includes propagation characteristic storage 401, a propagation characteristic acquisition module 402, and a communication module 403. The propagation characteristic storage 401 accumulates propagation characteristics with another wireless machine 4 measured in the wireless machine 4. The propagation characteristic acquisition module 402 acquires characteristic information including the propagation characteristics accumulated in the propagation characteristic storage 401. The characteristic information acquired by the propagation characteristic acquisition module 402 is transmitted to the electronic apparatus 10 by the communication module 403.

Note that although only one wireless machine 4 is shown in FIG. 7, other wireless machines 4 have the same functional configuration.

The electronic apparatus 10 includes a propagation characteristic acquisition module 101, an installation position acquisition module 102, an estimation module 103, and an output module 104.

The present embodiment assumes that part or all of each of these modules 101 to 104 are implemented by causing the CPU 11 to execute a program, i.e., by software. Note that part or all of the modules 101 to 104 may be implemented by hardware such as an integrated circuit (IC), or may be implemented as a combination configuration of software and hardware.

The propagation characteristic acquisition module 101 acquires (receives) characteristic information (propagation characteristics for each of the plurality of wireless machines 4) transmitted from each of the plurality of wireless machines 4.

The installation position acquisition module 102 acquires position information indicating a plurality of installation positions (i.e., as many the plurality of installation positions as the plurality of wireless machines 4) where the plurality of wireless machines 4 are installed. Note that for example, when the number of the plurality of wireless machines 4 is n (n is an integer equal to or greater than 2) (i.e., the first, to n-th wireless machines 4 exist), the installation position acquisition module 102 acquires position information indicating n installation positions.

The estimation module 103 estimates a combination (correspondence relationship) of each of the plurality of installation positions and each of the plurality of wireless machines 4 based on the propagation characteristics indicated by the characteristic information acquired by the propagation characteristic acquisition module 101 (propagation characteristics measured in each of the plurality of wireless machines 4) and the plurality of installation positions indicated by the position information acquired by the installation position acquisition module 102. According to the processing of the estimation module 103, it is possible to estimate the (wireless machine ID assigned to the) wireless machine 4 installed at the installation position for each installation position.

The output module 104 outputs the estimation result by the estimation module 103 (i.e., combination of each of the plurality of installation positions and each of the plurality of wireless machines 4).

Figure 8:
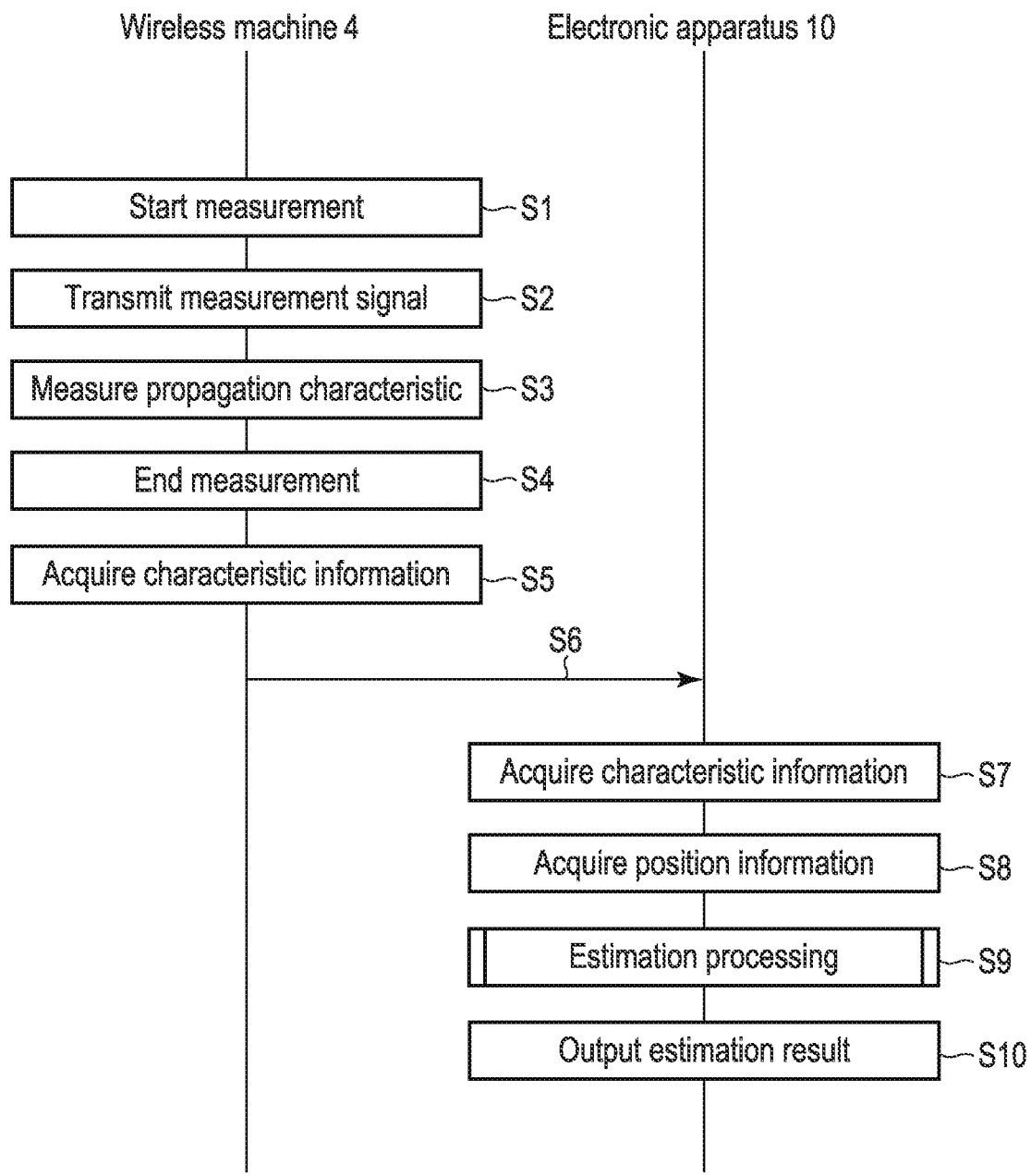
FIG. 8 is a sequence chart showing an example of a processing procedure of a plurality of wireless machines and an electronic apparatus in a case of estimating combination of each of the plurality of installation positions and each of the plurality of wireless machines.

Next, with reference to the sequence chart of FIG. 8, an example of the processing procedure of the plurality of wireless machines 4 and the electronic apparatus 10 in a case of estimating the combination of each of the plurality of installation positions and each of the plurality of wireless machines 4 will be described. FIG. 8 mainly describes the processing of one wireless machine (hereinafter referred to as a target wireless machine) 4 of the plurality of wireless machines 4, but similar processing is executed also in the other wireless machines 4.

First, the target, wireless machine 4 starts measurement of the propagation characteristics (step S1). The processing of step S1 is executed by an instruction from the electronic apparatus 10, for example, but may be executed by an instruction from the server device 5, the work terminal 6, or the like other than the electronic apparatus 10, or may be executed in a predetermined time slot.

When the measurement of the propagation characteristics is started in step S1, the target wireless machine 4 transmits, by broadcast, a signal for measuring the propagation characteristics (hereinafter referred to as a measurement signal) to the plurality of other wireless machines 4 at random timing (step S2). Note that the measurement signal (measurement packet) includes a wireless machine ID (i.e., wireless machine ID of the transmission source of the measurement signal) assigned to the target wireless machine 4.

Here, the measurement signal is similarly transmitted by broadcast also from the plurality of wireless machines 4 other than the target, wireless machine 4. Therefore, the target wireless machine 4 receives the measurement signals transmitted from each of the other wireless machines 4. When the target wireless machine 4 receives the measurement signal, the target wireless machine 4 measures the propagation characteristics related to the target wireless machine 4 based on the measurement signal (step S3).

Note that the target wireless machine 4 receives the measurement signal transmitted from each of the other wireless machines 4 (measurement signal including the wireless machine ID assigned to the other wireless machine 4), and in step S3, based on the measurement signal received by the target, wireless machine 4, the propagation characteristics between the target wireless machine 4 and the other wireless machines 4 to which the wireless machine ID included in the measurement signal is assigned are measured. That is, the propagation characteristics related to the target wireless machine 4 measured in step S3 include the propagation characteristics of each of the other wireless machines 4 measured based on the measurement signal transmitted from each of the other wireless machines 4.

The propagation characteristics in the present embodiment are only required to represent characteristics related to the wireless communication environment between the wireless machines 4, and the present embodiment assumes that, for example, a received signal strength indicator (RSSI) is measured as propagation characteristics.

In this case, in step S3, for example, a method of measuring the RSSI between the wireless machines 4 by utilizing the Trickle algorithm of RFC 6026, a method of measuring the RSSI for each SSID by using the Management Frame of IEEE 802.11, and the like can be applied.

The propagation characteristics measured in step S3 are accumulated in the propagation characteristic storage 401 described above in association with the wireless machine ID included in the measurement signal used for measurement of the propagation characteristics.

Note that the processing of steps S2 and S3 described above may be executed a plurality of times. In this case, the propagation characteristics (and wireless machine ID) are only required to be accumulated in the propagation characteristic storage 401 each time the measurement signal is received.

Although in FIG. 6, the processing of step S3 is executed after the processing of step S2 is executed for convenience, the processing of steps S2 and S3 may be replaced as appropriate.

Next, the target wireless machine 4 ends the measurement of the propagation characteristics (step S4). The processing of step S4 is executed by an instruction from the electronic apparatus 10, for example, but may be executed by an instruction from the server device 5, the work terminal 6, or the like other than the electronic apparatus 10, or may be executed when a predetermined period has elapsed since the processing of step S1 was executed.

When the processing of step S4 is executed, the propagation characteristic acquisition module 402 acquires characteristic information including the propagation characteristics accumulated in the propagation characteristic storage 401 (step S5). Mote that the characteristic information acquired in step S5 includes the propagation characteristics (propagation characteristics with the other wireless machine 4) of each of the other wireless machines 4 measured based on the measurement signal transmitted from each of the other wireless machines 4.

In the case where the propagation characteristics with the one of the other wireless machines 4 have been measured a plurality of times by executing the processing of step S3 a plurality of times, the characteristic information acquired in step S5 includes the maximum value from among the propagation characteristics (RSSI) having been measured the plurality of times. Here, although the description has been made assuming that the maximum value from among the propagation characteristics measured a plurality of times is included in the characteristic information, the characteristic information may include, for example, at least one of the mean value, median value, mode value, and standard deviation instead of the maximum value.

Here, FIG. 9 shows an example of the data structure of the characteristic information to be acquired in step S5. FIG. 9 assumes a case where the plurality of wireless machines 4 are eight wireless machines assigned with wireless machine IDs "D1" to "D8", respectively (hereinafter referred to as the wireless machines D1 to D8), and the wireless machines D1 from among the eight wireless machines D1 to D8 is the target wireless machine 4.

The characteristic information acquired in step S5 in this case includes, in association with the wireless machine ID "D1" assigned to the wireless machine D1, propagation characteristics measured based on the measurement signal transmitted from each of the other wireless machine D2 to D8 assigned with the wireless machine IDs "D2" to "D8" (i.e., propagation characteristics between the wireless machine D1 and each of the other wireless machines D2 to D8) and IDs "D2" to "D8" assigned to the other wireless machine D2 to D8, respectively.

In the example shown in FIG. 9, the characteristic information includes a propagation characteristic "−50" in association with the wireless machine ID "D1" and the wireless machine ID "D2". This indicates that the propagation characteristic (RSSI) measured in the wireless machine D1 based on the measurement signal transmitted from the wireless machine D2 is −50.

The characteristic information includes a propagation characteristic "−51" in association with the wireless machine ID "D1" and the wireless machine ID "D3". This indicates that the propagation characteristic (RSSI) measured in the wireless machine D1 based on the measurement signal transmitted from the wireless machine D3 is −51.

The propagation characteristics between the wireless machine D1 and each of the wireless machines D2 and D3 have been described here, but the same applies to the propagation characteristics between the wireless machine D1 and each of the other wireless machines D4 to D8.

Returning to FIG. 8 again, the communication module 403 transmits the characteristic information acquired in step S5 to the electronic apparatus 10 (step S6).

Here, the processing of steps S1 to S6 described above is executed in each of the plurality of wireless machines 4. Therefore, when the processing of step S6 is executed in each of the plurality of wireless machines 4, the electronic apparatus 10 receives the characteristic information transmitted from each of the plurality of wireless machines 4. Note that the characteristic information received by the electronic apparatus 10 may be stored in storage (not illustrated) included in the electronic apparatus 10, for example.

Next, the propagation characteristic acquisition module 101 included in the electronic apparatus 10 acquires the characteristic information received by the electronic apparatus 10 (step S7). Note that FIG. 10 shows an example of the data structure of the characteristic information acquired by the propagation characteristic acquisition module 101. Assuming that the plurality of wireless machines 4 are the wireless machines D1 to D8 as described above, the propagation characteristic acquisition module 101 acquires characteristic information 101a to 101h received from the respective wireless machines D1 to D8.

Returning to FIG. 8 again, the installation position acquisition module 102 acquires position information indicating the installation positions (i.e., plurality of installation positions) of the plurality of wireless machines 4 as described above (step S8).

The (plurality of installation positions indicated by) position information acquired in step S8 is input by the worker via the work terminal 6, for example, but may be registered in advance.

The position information indicating the plurality of installation positions will be described below. When the position information is input by the worker, the worker operates the work terminal 6, for example, thereby inputting (specifying) X coordinates and Y coordinates of the installation positions P1 to P8 of the plurality of wireless machines 4 (e.g., wireless machines D1 to D8) as shown in FIG. 11.

Figures 11, 12:
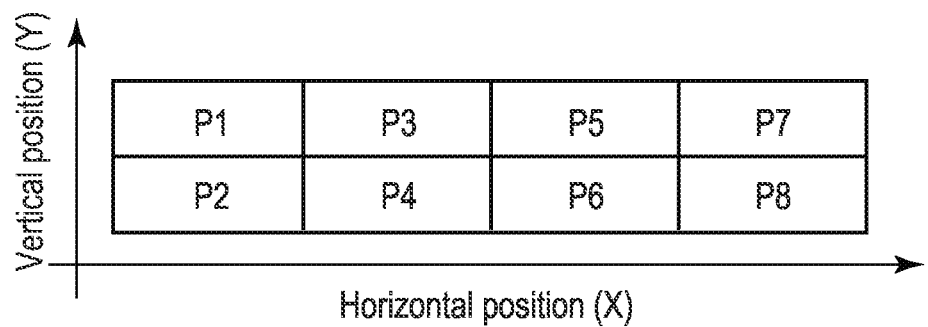
FIG. 11 is a view for explaining position information indicating a plurality of installation positions.
FIG. 12 shows an example of a data structure of position information.

When the X coordinates and the Y coordinates of the installation positions P1 to P8 are input by the worker as described above, the installation position acquisition module 102 can acquire the position information as shown in FIG. 12, for example.

Here, assuming that identification information (hereinafter referred to as installation position ID) assigned to each of the installation positions P1 to P8 is "P1" to "P8", the position information includes the X coordinates and the Y coordinates corresponding to each of the installation position IDs "P1" to "P8". Note that the X coordinate is an X coordinate value of the installation position to which the associated installation position ID is assigned. Note that the Y coordinate is a Y coordinate value of the installation position to which the associated installation position ID is assigned. In the position information, the X coordinate value end the Y coordinate value represent the position (installation position) where one wireless machine 4 is installed.

In the example shown in FIG. 12, the position information includes the X coordinate "1" and the Y coordinate "2" in association with the installation position ID "P1". This indicates that one wireless machine 4 of the plurality of wireless machines 4 is installed at the installation position P1 (installation position assigned with the installation position ID "P1") in which the X coordinate value is 1 and the Y coordinate position is 2.

The position information includes the X coordinate "1" and the Y coordinate "1" in association with the installation position ID "P2". This indicates that one wireless machine 4 of the plurality of wireless machines 4 is installed at the installation position P2 (installation position assigned with the installation position ID "P2") in which the X coordinate value is 1 and the Y coordinate position is 1.

While only the installation positions P1 and P2 have been described here, the same applies to the other installation positions P3 to P8.

According to the position information shown in FIG. 12, it is possible to specify the (X coordinates and the Y coordinates of) installation positions P1 to P8 where the wireless machines D1 to D8 are installed, but it is not possible to discriminate as to which wireless machine of the wireless machines D1 to D8 is installed in each of the installation positions P1 to P8.

In the example shown in FIG. 12, the installation position has been described as being represented by the X coordinate and the Y coordinate, but the installation position may be represented by the X coordinate, the Y coordinate, and the Z coordinate, or may be represented by other values.

Although the description has been made here on an assumption that the X coordinate and the Y coordinate representing each of the installation positions P1 to P8 are input by the worker, a file or the like as shown in FIG. 13, for example, in which the coordinate values (X coordinate value and Y coordinate value) of each of the installation positions P1 to P8 are defined in order from the top may be used as the position information.

Furthermore, the position information may be acquired by displaying, on the work terminal 6, a view (input screen for inputting position information) schematically representing a region where the wireless machines D1 to D8 are installed as shown in FIG. 14, for example, and by the worker arranging the (solar panels 1a to 1h with) wireless machines D1 to D8 on the view.

The installation position acquisition module 102 may be configured to automatically extract position information from, for example, drawings showing the arrangement of the solar panels 1a to 1h (wireless machines D1 to D8).

Returning to FIG. 8 again, the estimation module 103 executes processing (hereinafter referred to as estimation processing) of estimating the combination of each of the plurality of installation positions and each of the plurality of wireless machines 4 based on the propagation characteristics included in the characteristic information acquired in step S7 and the plurality of installation positions indicated by the position information acquired in step S8 (step S9).

In the present embodiment, the combination of each of the plurality of installation positions and each of the plurality of wireless machines 4 includes, for each installation position, a one-to-one correspondence relationship (combination) between one installation position and one wireless machine 4 installed at the installation position.

Specifically, when the plurality of installation positions are the installation positions P1 to P8 and the plurality of wireless machines 4 are the wireless machines D1 to D8 as described above, the combination of each of the installation positions P1 to P8 and each of the wireless machines D1 to D8 is, for example, "P1-D2, P2-D3, P3-D4, P4-D5, P5-D6, P6-D7, P7-D8, P8-D1". Note that "P1-D2, P2-D3, P3-D4, P4-D5, P5-D6, P6-D7, P7-D8, P8-D1" means that the wireless machine D2 is installed at the installation position P1, the wireless machine D3 is installed at the installation position P2, the wireless machine D4 is installed at the installation position P3, the wireless machine D5 is installed at the installation position P4, the wireless machine D6 is installed at the installation position P5, the wireless machine D7 is installed at the installation position P6, and the wireless machine D1 is installed at the installation position P8.

While various combinations of each of the plurality of installation positions and each of the plurality of wireless machines 4 can be conceived, a combination (optimum combination) in which each of the plurality of installation positions and each of the plurality of wireless machines 4 is appropriately associated is estimated from among the various combinations in the present embodiment. This optimum combination shall be estimated by using a predetermined algorithm (e.g., optimization algorithm).

In general, in the optimization algorithm, the processing of calculating the evaluation value is executed for all of the combinations of each of the plurality of installation positions and each of the plurality of wireless machines 4 (combination of the number of installation positions and the number of wireless machines 4 according to the factorial). However, when the number of installation positions and the number of wireless machines 4 are large, the calculation amount in the estimation processing becomes enormous.

On the other hand, when, for example, a genetic algorithm is used as the optimization algorithm, the number of early genes (initial values) can be reduced and the calculation amount in estimation processing can be suppressed.

Figure 15:
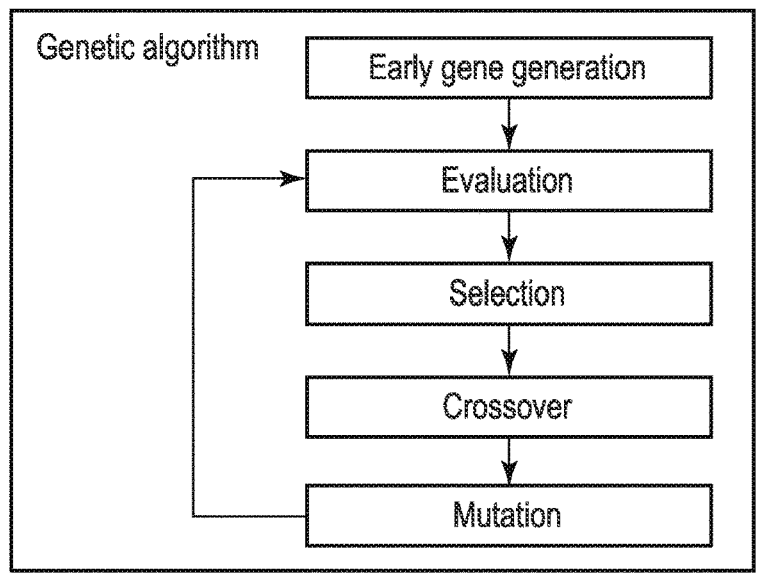
FIG. 15 is a view representing an outline of a genetic algorithm.

Here, FIG. 15 is a view representing an outline of the genetic algorithm. First, in the genetic algorithm, a plurality of combinations of each of the plurality of installation positions and each of the plurality of wireless machines 4 are randomly generated, and the plurality of generated combinations are used as early genes.

Next, the early genes (plurality of combinations) are used to selectively and repeatedly execute the processing (phase) of executing genetic operations referred to as "evaluation", "selection", "crossover", and "mutation".

The "evaluation" includes processing of calculating an evaluation value for each combination (gene). The evaluation value is calculated based on, for example, the correlation relationship between the distances between the plurality of installation positions and the propagation characteristics of each of the plurality of wireless machines 4.

The "selection" corresponds to selection of superior genes and includes processing of selecting a combination with a high evaluation value. When RSSI has been measured as the propagation characteristic, the larger the distance between the installation positions is, the smaller the RSSI becomes (attenuates), and therefore a combination in which the correlation coefficient (evaluation value), which is an index representing the correlation relationship described above, is close to −1 is selected.

The "crossover" corresponds to crossover of genes and includes processing of creating a combination similar to the combination selected in "selection".

The "mutation" corresponds to mutation in a gene and includes processing of changing an optional number of correspondence relationships between the installation position and the wireless machine 4 in the combination selected in the "selection".

In the genetic algorithm, the above-described "evaluation", "selection", "crossover", and "mutation" are repeatedly executed to finally converge and obtain an optimum, solution (optimum combination).

Here, the calculation amount required for the convergence of the processing (evaluation value) based on the genetic algorithm greatly depends on the early gene. Specifically, for example, if the combination used as the early gene described above includes a combination at least partially corresponding to the optimum combination (correct answer) to be estimated, the processing based on the genetic algorithm converges early.

However, in a heuristic optimization algorithm such as the genetic algorithm described above, since the early genes are generated at random, there is a high possibility that the early genes are deviated from the correct answer (reality), and the processing (evaluation value) based on the genetic algorithm sometimes does not converge efficiently.

Therefore, in the present embodiment, by reflecting the knowledge that the RSSI (propagation characteristic) described above attenuates according to the distance to the combination used as the early gene, the estimation of the optimum combination is efficiently realized (i.e., processing based on the genetic algorithm is efficiently converged). Specifically, in the present embodiment, the early gene of the genetic algorithm is generated based on the arrangement of the plurality of installation positions based on the distances between the plurality of installation positions and the arrangement of the plurality of wireless machines 4 based on the propagation characteristics of each of the plurality of wireless machines 4. The estimation processing in step S9 will be described in detail later.

When the processing of step S9 is executed, the output module 104 outputs, as the estimation result, the optimum combination estimated by the estimation processing of step S9 (step S10). Note that the estimation results may be output in a mode that can indicate the correspondence relationship (combination) between each of the plurality of installation positions and each of the plurality of wireless machines 4. Specifically, the estimation result may be output in a file format in which, for example, the coordinates (X and Y coordinates) representing the installation position and the wireless machine ID assigned to the wireless machine 4 estimated to be installed at the installation position are described for each installation position, or may be output in a format such as a table or a drawing representing the correspondence relationship between each of the plurality of installation positions and each of the plurality of wireless machines 4.

The estimation results output in step S10 can be used to monitor the state of each of the solar panels 1a to 1h shown in FIG. 1, for example. Use of the estimation result also enables a screen as shown in FIG. 4 to be displayed.

With reference to the flowchart of FIG. 16, an example of the processing procedure of the estimation processing (processing of step S9 shown in FIG. 8) will be described below.

First, the estimation module 103 calculates the distances between the plurality of installation positions indicated by the position information acquired by the installation position acquisition module 102 in step S3 shown in FIG. 8 (step S21). In step S21, for each set of two installation positions from among the plurality of installation positions, the distance between the two installation positions is calculated. The distance between the two installation positions is, for example, an Euclidean distance, and is calculated using the X and Y coordinates included in the position information in association with the installation position ID assigned to each of the two installation positions.

When the processing of step S21 is executed, the estimation module 103 determines, based on the distance calculated for each, set of the two installation positions in step S21, an installation position (hereinafter referred to as a start point installation position) to be the start point (reference) of the arrangement of the plurality of installation positions for generating the early gene of the genetic algorithm (step S22).

In step S22, the installation position positioned at the end of the plurality of installation positions is determined as the start point installation position. In this case, one of the two installation positions having the longest distance from among the distances calculated for each set of two installation positions in step S21 is set as the start point installation position.

When the processing of step S22 is executed, the estimation module 103 determines the order (arrangement) of the plurality of installation positions by arranging the plurality of installation positions in ascending order or the distance calculated in step S21 between the start point installation position and the other installation position with the start point installation position determined in step S22 as the start point (step S23). Starting from the edge makes it easier to reflect, the tendency for RSSI to attenuate with distance on the early gene. On the other hand, if the start point is set to the center installation position and the installation positions are arranged in ascending order of distance, the installation position order extends from the center to the right and left. That is, when the center is set to the start point, since the number of installation positions having similar distances increases on the right and left sides, it becomes difficult to reflect the tendency for the RSSI to attenuate with distance on the early gene.

Next, the processing of steps S24 and S25 is executed for each of the plurality of wireless machines 4. In the description of FIG. 16, the wireless machine 4 to be subjected to the processing of steps S24 and S25 is referred to as the target wireless machine 4.

Here, since the RSSI measured as the propagation characteristic attenuates as the distance between the two wireless machines 4 is large, according to the RSSI (propagation characteristic) measured in each of the plurality of wireless machines 4 indicated by the characteristic information acquired by the propagation characteristic acquisition module 101 in step S7 shown in FIG. 8 described above, the distance of each set of two wireless machines 4 from among the plurality of wireless machines 4 can be estimated.

In this case, the estimation module 103 determines the order (arrangement) of the plurality of wireless machines 4 by arranging the plurality of wireless machines 4 in ascending order of distance between the target wireless machine 4 and the other wireless machines 4 estimated based on the RSSI with the target wireless machine 4 as a start point (step S24).

When the processing of step S24 is executed, the estimation module 103 generates one of the early genes (initial values) of the genetic algorithm based on the order of the plurality of installation positions determined in step S23 and the order of the plurality of wireless machines determined in step S24 (step S25). The early gene generated in step S25 is a combination of each of the plurality of installation positions and each of the plurality of wireless machines 4 as described above.

Here, the early gene of the genetic algorithm generated in step S25 will be specifically described with reference to FIG. 17. Here, it is assumed that the plurality of installation positions are the installation positions P1 to P8, and the plurality of wireless machines 4 are the wireless machines D1 to D8. The start point installation position determined in step S22 is assumed to be the installation position P1. Furthermore, the target wireless machine 4 is assumed to be the wireless machine D1.

Figure 17:
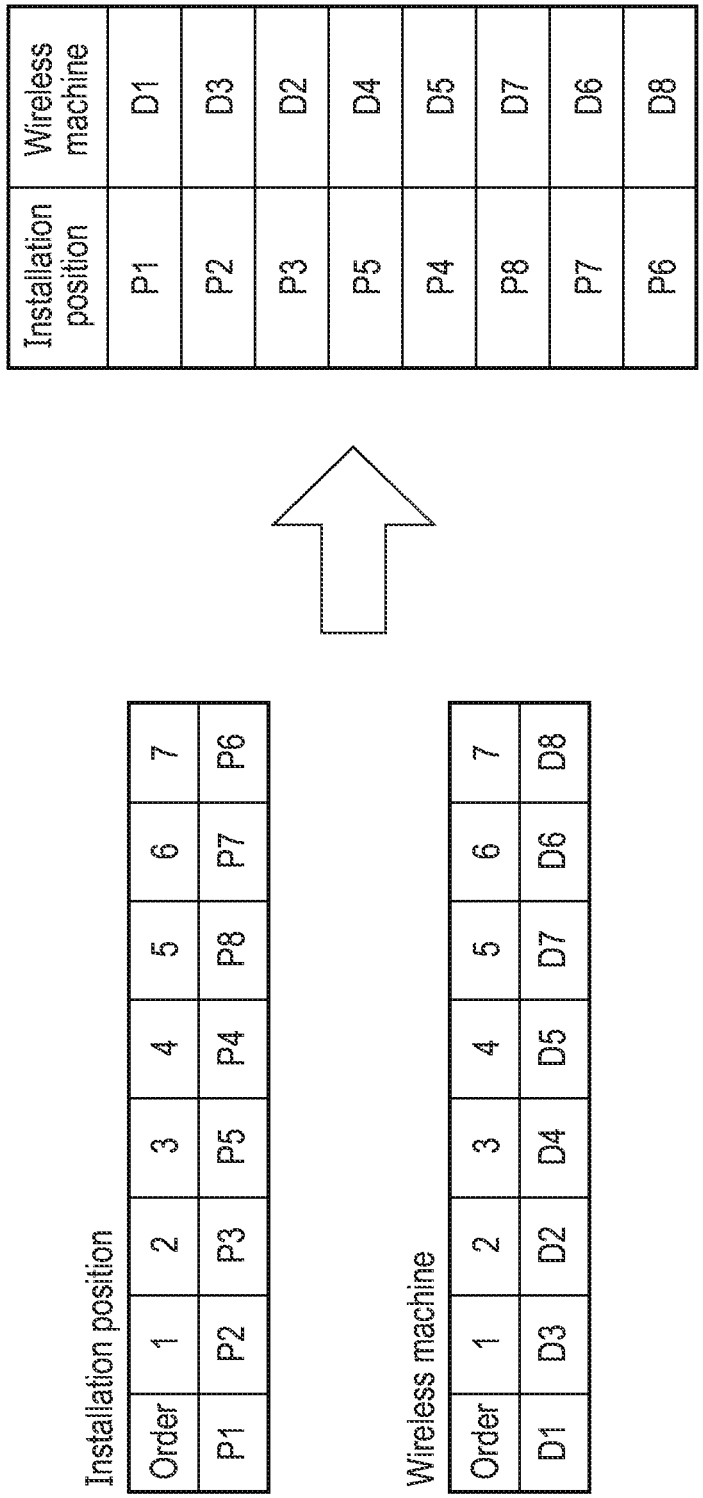
FIG. 17 is a table for specifically explaining an early gene of the genetic algorithm.

In this case, the order of the installation positions P1 to P8 determined in step S23 is assumed to be the installation positions P1, P2, P3, P5, P4, P8, P7, and P6 as shown in FIG. 17.

On the other hand, the order of the wireless machines D1 to D3 determined in step S24 is assumed to be the wireless machines D1, D3, D2, D4, D5, D7, D6, and D8 as shown in FIG. 17.

In this case, the estimation module 103 generates an early gene by associating the installation position P1 set as the start point with the wireless machine D1, and associating the installation position with the wireless machine having the identical order (arrangement) from the installation position P1 and the wireless machine D1, respectively.

According to this, as shown in FIG. 17, combinations of each of the plurality of installation positions P1 to P8 and each of the plurality of wireless machines 4 in which the installation position P1 and the wireless machine D1 (P1-D1), the installation position P2 and the wireless machine D3 (P2-D3), the installation position P3 and the wireless machine D2 (P3-D2), the installation position PS and the wireless machine D4 (P5-D4), the installation position P4 and the wireless machine D5 (P4-D5), the installation position P8 and the wireless machine D7 (P8-D7), the installation position P7 and the wireless machine D6 (P7-D6), and the installation position P6 and t wireless machine D8 (P6-D8) are respectively associated are generated as early genes.

The early gene generated as described above can be expressed by an array having, for example, the installation position (installation position ID) as an index and the wireless machine ID as a value.

Returning to FIG. 16 again, it is determined whether or not. the processing of steps S24 and S25 have been executed for all the wireless machines 4 (step S26).

If it is determined that the processing has not been executed for all the wireless machines 4 (NO in step S26), the process returns to the step S24 and the processing is repeated. In this case, the wireless machine 4 for which the processing of steps S24 and S25 has not been executed is used as the target wireless machine 4 and the processing is executed.

On the other hand, if it is determined that the processing has been executed for ail the wireless machines 4 (YES in step S26), the estimation module 103 executes the (processing based on the) genetic algorithm using the early gene generated in step S25, and estimates the optimum combination of each of the plurality of installation positions and each of the plurality of wireless machines 4 (step S27).

That is, in the present embodiment, a plurality of early genes can be generated by respectively associating the order of the plurality of installation positions determined in step S23 with the order of the plurality of wireless machines sequentially determined in step S24 by changing the wireless machine 4 serving as the start point. In the present embodiment, the optimum combination is estimated by using the plurality of thus generated early genes.

Figure 16:
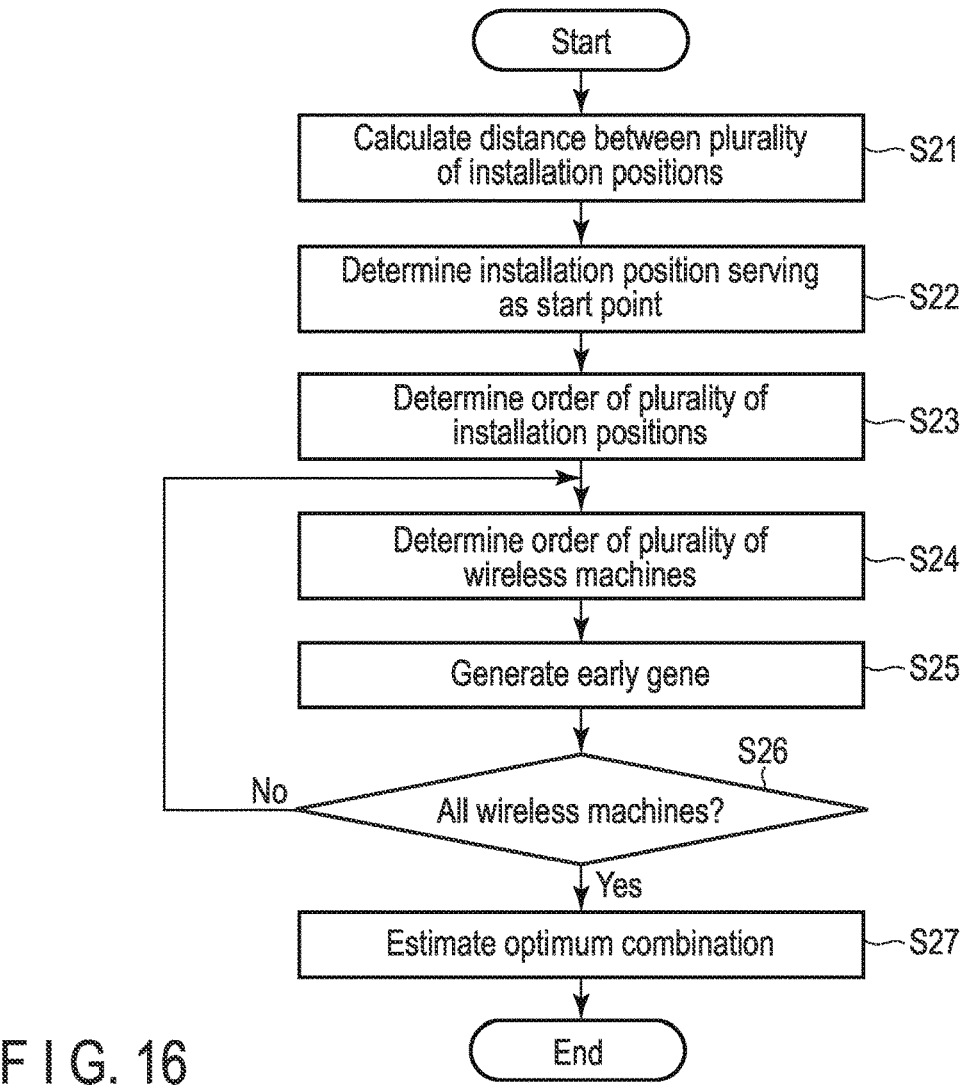
FIG. 16 is a flowchart showing an example of a processing procedure of estimation processing.

In the processing shown in FIG. 16, the description has been made on the assumption that the early gene of the genetic algorithm is generated based on the order of the plurality of installation positions when the installation position positioned at the end of the plurality of installation positions is set as the start point, but the order of the plurality of installation positions may be determined, for example, with any installation position from among the plurality of installation positions as the start point.

In the processing shown in FIG. 16, the description has been made on the assumption that the early gene is generated with the order of the plurality of installation positions being fixed, but for example, the early gene may be generated by sequentially changing the installation positions serving as the start points on the side of the plurality of installation positions. In this case, the initial value may be generated for each set of the installation position serving as the start point and the wireless machine serving as the start point.

Furthermore, for example, in a case where the correspondence relationship between at least one of the plurality of installation positions and at least one of the plurality of wireless machines is already known, the optimum combination may be estimated by using the early gene generated with the installation position and the wireless machine for which the correspondence relationship is known as the start points, respectively.

As described above, in the present embodiment, a plurality of installation positions (n installation positions) where a plurality of wireless machines (first to n-th pieces of equipment) are installed are acquired, propagation characteristics (RSSI) related to the plurality of wireless machines are acquired, and the optimum combination of each of the plurality of wireless machines and each of the plurality of installation positions is estimated based on the propagation characteristics by using the genetic algorithm. In the present embodiment, the early gene (initial value) of the genetic algorithm is generated based on the arrangement (order) of the plurality of installation positions and the arrangement (order) of the plurality of wireless machines determined based on the propagation characteristics of each of the plurality of wireless machines.

The arrangement of the plurality of installation positions when generating the early gene described above is determined by the distance between the first installation position and the second installation position other than the first installation position when the first installation position (start point position) from among the plurality of installation positions is set as the start point. The first installation position is, for example, an installation position positioned at an end of the plurality of installation positions, and is one of two installation positions having the longest distance from among the distances between the plurality of installation positions.

The arrangement of the plurality of wireless machines when generating the early gene described above is determined by the distance between the plurality of wireless machines based on the propagation characteristics of each of the plurality of wireless machines. Specifically, the arrangement of the plurality of wireless machines includes the arrangement determined by the distance between the first wireless machine and the second wireless machine other than the first wireless machine when the first wireless machine from among the plurality of wireless machines is set to the start point, and the arrangement determined by the distance between the third wireless machine and the fourth wireless machine other than the third wireless machine when the third wireless machine from among the plurality of wireless machines is set to the start point.

The distance between the plurality of wireless machines based on the propagation characteristics (RSSI) of each of the plurality of wireless machines described above may be estimated simply based on the RSSI between the plurality of wireless machines, but it can also be estimated in consideration of the similarity of the RSSI seen from a third party, for example.

The similarity of RSSI seen from a third party means that the RSSI with one wireless machine of two wireless machines installed in the vicinity is similar to the RSSI with the other wireless machine, when the two wireless machines are seen from another wireless machine (third party), for example.

Figure 18:
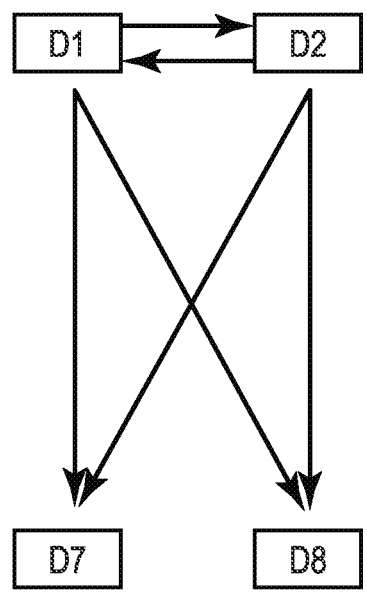
FIG. 18 is a view for explaining a similarity of RSSI.

It is assumed here a case where, as shown in FIG. 18, the wireless machines D1, D2, D7, and D8 are installed, the RSSI with each of the wireless machines D2, D7, and D8 is measured in the wireless machine D1, and the RSSI with each of the wireless machines D1, D7, and D3 is measured in the wireless machine D2. It is assumed that the wireless machines D7 and D8 are installed in the vicinity of each other.

Figure 19:
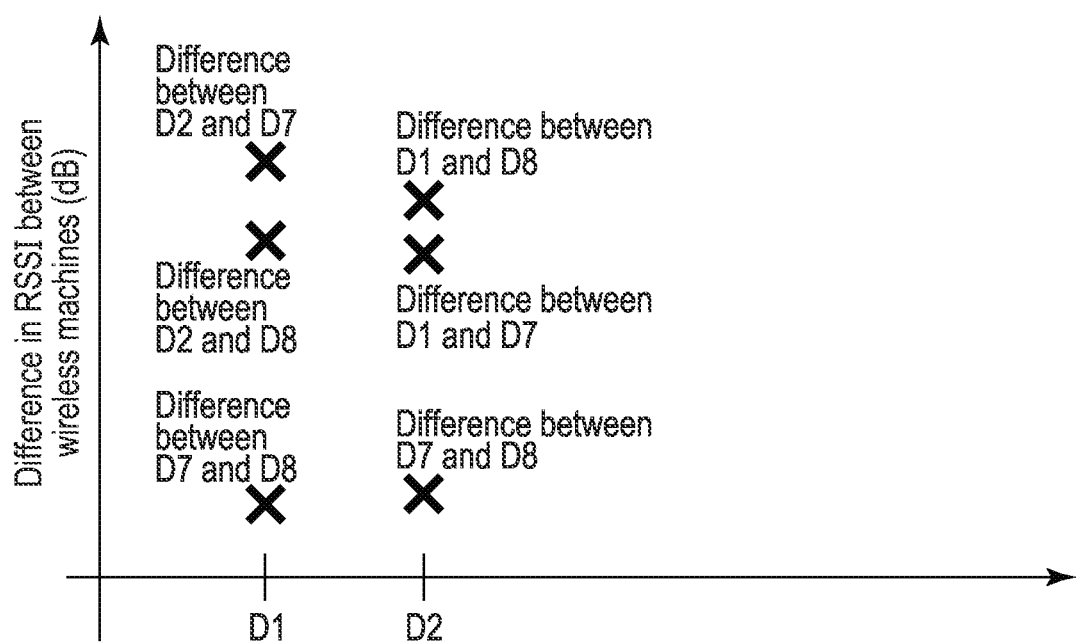
FIG. 19 is a view for explaining a similarity of RSSI.

In this case, as shown in FIG. 19, the difference between the RSSI with the wireless machine D7 measured in the wireless machine D1 and the RSSI with the wireless machine D8 measured in the wireless machine D1 becomes small. Similarly, the difference between the RSSI with the wireless machine D7 measured in the wireless machine D2 and the RSSI with the wireless machine D8 measured in the wireless machine D2 also becomes small.

When the similarity of the RSSI seen from the third party is considered, the accuracy of the distance between a plurality of wireless machines estimated from the RSSI can be improved, and hence the early gene of the genetic algorithm can be generated based on the order of a plurality of appropriate wireless machines.

Here, since the knowledge that the RSSI attenuates according to the distance is reflected on the early gene generated as described above, the early gene is highly likely to coincide with a combination (optimum combination) at least a part of which is correct, as compared with a randomly generated early gene, for example.

Therefore, in the present embodiment, it can be expected that the processing based on the genetic algorithm, converges early in a case of estimating the optimum combination of each of the plurality of installation positions and each of the plurality of wireless machines 4, and it becomes possible to efficiently estimate the position where each of the plurality of wireless machines is installed. In the present embodiment, the position where each of the plurality of wireless machines is installed corresponds to the installation position of various equipment where each of the plurality of wireless machines including the solar panel and lighting equipment are installed.

Figure 20:
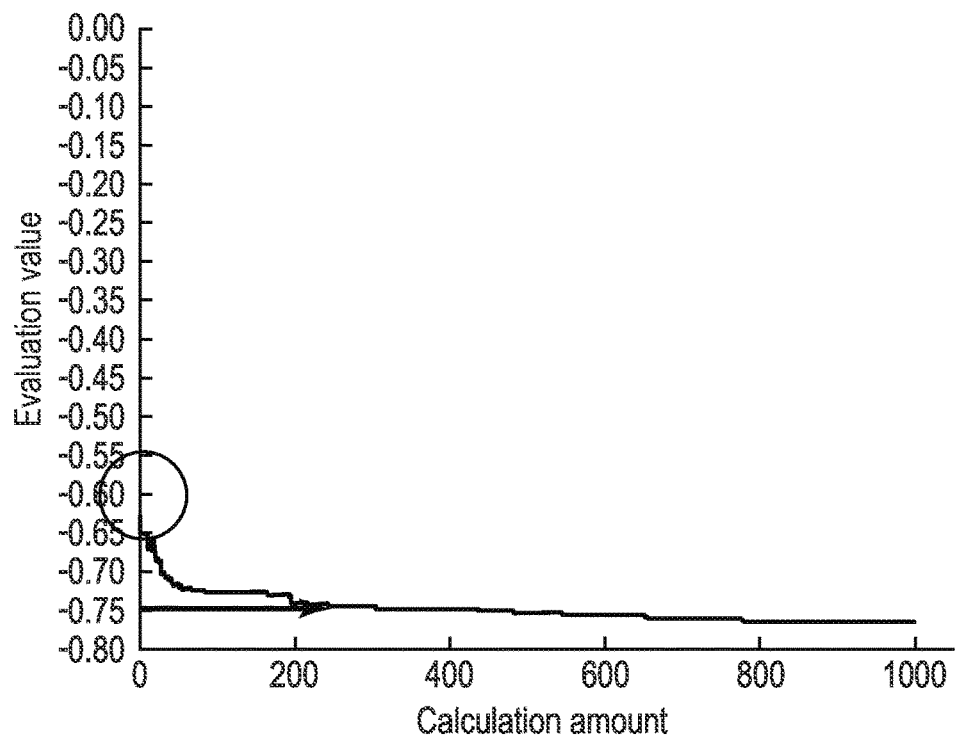
FIG. 20 is a graph showing an example of a calculation amount until convergence of processing when an early gene generated in the present embodiment is used.

FIG. 20 shows the calculation amount until the processing based on the genetic algorithm converges when the optimum combination is estimated using the early gene generated in the present embodiment. On the other hand, FIG. 21 shows the calculation amount until the processing based on the genetic algorithm converges when the optimum combination is estimated using the randomly generated early gene.

Figure 21:
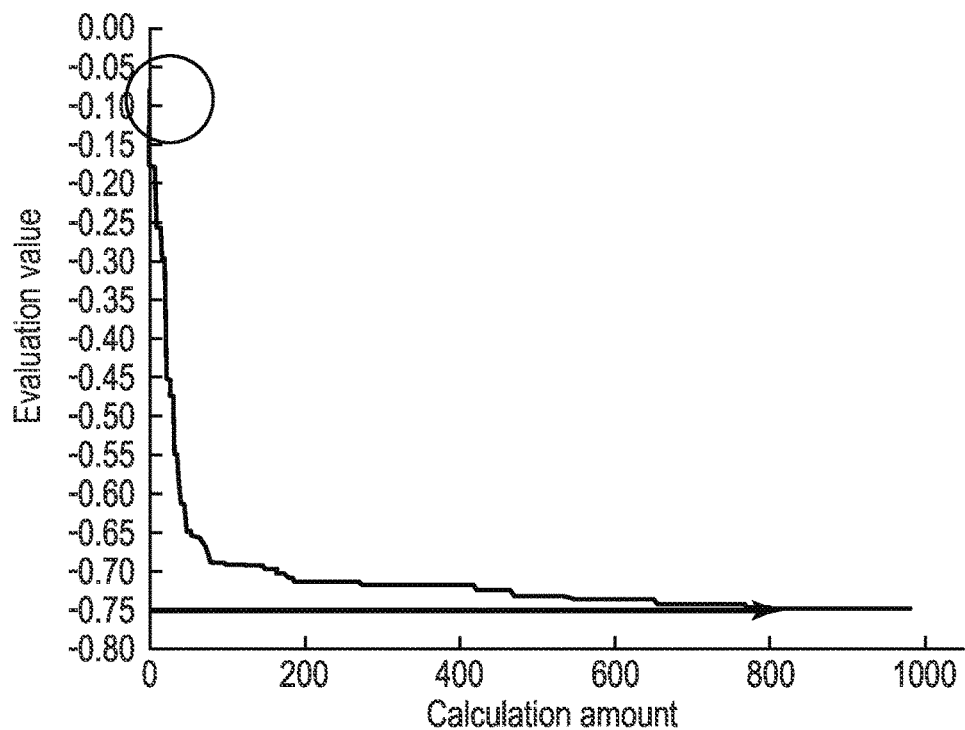
FIG. 21 is a graph showing an example of a calculation amount until convergence of processing when a randomly generated early gene is used.

Comparing FIG. 20 with FIG. 21, when the early gene generated in the present embodiment is used, a high evaluation value (value close to −1) is calculated from the initial stage, and the calculation amount (number of generations) until convergence is about ¼ of that when the randomly generated early gene is used. As described above, in the present embodiment, since the calculation amount in the processing based on the genetic algorithm can be reduced, the optimum combination can be efficiently estimated.

Here, in the present embodiment, the early gene (combination) is generated by associating the order of the plurality of installation positions with the order of the plurality of wireless machines, and in this case, depending on the wireless machine serving as the start point from among the plurality of wireless machines, there may be a case where the order of the plurality of wireless machines is the reverse of a combination (optimum combination) that is correct with respect to the order of the plurality of installation positions.

As a simple example, it is assumed a case where the plurality of installation positions are the installation positions P1 to P8, the plurality of wireless machines are the wireless machines D1 to D8, and the combination that is correct is "P1-D1, P2-D2, P3-D3, P4-D4, P5-D5, P6-D6, P7-D7, P8-D8". In this case, "the order of the plurality of wireless machines is the reverse of a combination that is correct" described above refers to a state in which the order of the installation positions P1 to P8 determined in step S23 shown in FIG. 16 is the installation positions P1, P2, P3, P4, P5, P6, P7, P8, while the order of the wireless machines D1 to D8 determined in step S24 shown in FIG. 16 is the wireless machines D8, D7, D6, D5, D4, D3, D2, D1.

In the present embodiment, in consideration of the possibility that such a gene exists in the processing based on the genetic algorithm, it is assumed that in "mutation" in the genetic algorithm, processing of reversing the order of the plurality of wireless machines (wireless machines D1 to D8) (i.e., changing the order of the wireless machines D8, D7, D6, D5, D4, D3, D2, D1 to the wireless machines D1, D2, D3, D4, D5, D6, D7, D8) is executed. Such processing can improve the possibility of earlier convergence of the processing based on the genetic algorithm.

Although the present embodiment has been described as using the genetic algorithm as an example of the optimization algorithm, the present embodiment may be applied to an optimization algorithm other than the genetic algorithm. The present embodiment may be applied to other algorithms that estimate a suboptimum combination, for example.

The present embodiment has been described as using the RSSI as the propagation characteristics of each of the plurality of wireless machines, but, for example, packet error rate (PER) or the like may be used as the propagation characteristics.

Furthermore, in the present embodiment, it has been described that each of the modules 101 to 104 shown in FIG. 7 is included in one device, but each of the modules 101 to 104 may be arranged in a plurality of devices. That is, the electronic apparatus 10 according to the present embodiment may be implemented by a plurality of devices.

Second Embodiment

Next, the second embodiment will be described. Note that in the present embodiment, parts similar to those in the drawings used in the description of the first embodiment described earlier are given the identical reference numerals for description. In the following description, parts different from those of the first embodiment described above will be mainly described.

The present embodiment is different from the above-described first embodiment in that the combination (correspondence relationship) of each of the plurality of installation positions and each of the plurality of wireless machines 4 is input in advance by the worker.

Figures 22, 23:
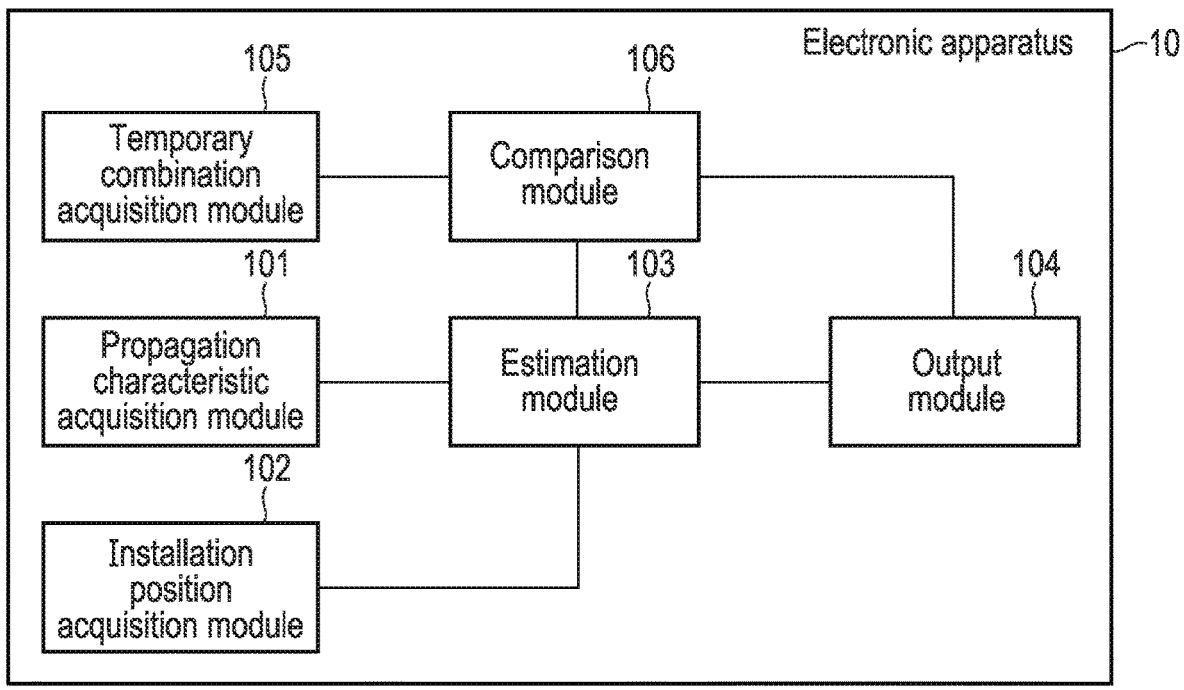
FIG. 22 is a block diagram showing an example of a functional configuration of an electronic apparatus according to a second embodiment.
FIG. 23 is a view showing an example of a screen of a work terminal for inputting a temporary combination.

FIG. 22 is a block diagram showing an example of a functional configuration of an electronic apparatus 10 according to the present embodiment. In the present embodiment, the electronic apparatus 10 includes a temporary combination acquisition module 105 and a comparison module 106.

Note that the present embodiment assumes that part or all of each of the modules 105 and 106 are implemented by causing the CPU 11 shown in FIG. 6 described above to execute a program, i.e., by software. Part or all of each of these modules 105 and 106 may be implemented by hardware, or may be implemented as a combination configuration of software and hardware.

The temporary combination acquisition module 105 acquires a combination (hereinafter referred to as a temporary combination) of each of the plurality of installation positions and each of the plurality of wireless machines 4 having been input (created) by the worker at a site where the plurality of wireless machines 4 are installed, for example.

Note that this temporary combination can be input by the worker with the work terminal 6 similarly to the position information (installation position) described in the above-described first embodiment. Specifically, when the view as shown in FIG. 14 described above is displayed on the work terminal 6, the correspondence relationship between the installation position and the (wireless machine ID assigned to the) wireless machine 4 installed at the installation position is only required to be input for each installation position on the view as shown in FIG. 23, for example. The temporary combination having been input in the work terminal 6 is transmitted to the electronic apparatus 10.

The comparison module 106 compares the optimum combination estimated by the estimation module 103 as described in the above-described first embodiment with the temporary combination (i.e., combination having been input by the worker) acquired by the temporary combination acquisition module 105.

The comparison result by the comparison module 106 is output by the output module 104 to the work terminal 6, for example.

Although the operations of each of the plurality of wireless machines 4 and the electronic apparatus 10 will not be described in detail, in the present embodiment, for example, after the processing of step S10 shown in FIG. 8 described in the above-described first embodiment is executed, the processing of acquiring the temporary combination by the temporary combination acquisition module 105 and the comparison processing by the comparison module 106 are only required to be executed.

As described above, the present embodiment assumes that the temporary combination having been input by the worker is acquired, but since the temporary combination is input by the worker, for example, at a site, there is a possibility that an error is included in a part of the combination of each of the plurality of installation positions and each of the plurality of wireless machines 4.

Therefore, in the present embodiment, the electronic apparatus 10 can be used for the purpose of checking whether or not the temporary combination contains an error by a configuration of comparing the temporary combination having been input by the worker with the estimation result by the estimation module 103 and outputting the comparison result.

The comparison result is only required to be displayed (output) on the work terminal 6 in a mode, for example, as to highlight the combination of the installation position and the wireless machine 4 having an error in correspondence relationship from among the plurality of combinations of the installation positions and the wireless machines 4 shown in FIG. 23. The highlighting includes, for example, displaying in bold or a different color the combination of the installation position and the (wireless machine ID assigned to the) wireless machine A having an error in correspondence relationship.

Since the temporary combination acquired in the present embodiment is input by the worker who has installed a plurality of wireless machines 4, there is a possibility that an error is partially included as described above, but at least most of the temporary combination is accurate, and there is also a possibility that the correspondence relationship between all the installation positions and the wireless machines included in the temporary combination is correct.

Therefore, in the present embodiment, the temporary combination having been input by the worker is used as the early gene of the genetic algorithm. Thus, it is expected that the optimum combination is estimated more efficiently compared with the first embodiment. In this case, the processing of acquiring the temporary combination by the temporary combination acquisition module 105 is only required to be executed before the processing of step S9 shown in FIG. 8 described above is executed.

Although the present embodiment, has been described on the assumption that the temporary combination having been input in the work terminal 6 is acquired in the electronic apparatus 10, the temporary combination may be directly input to the electronic apparatus 10 using an input device included in the electronic apparatus 10, for example.

Third Embodiment

Next, the third embodiment will be described. Note that in the present embodiment, parts similar to those in the drawings used in the description of the first embodiment described earlier are given the identical reference numerals for description. In the following description, parts different from those of the first embodiment described above will be mainly described.

Here, in an environment with much reflection of radio waves, a phenomenon called multipath fading, in which direct waves and reflected waves interfere with each other, occurs, and even if the distance between the two wireless machines 4 is the same, the RSSI sometimes drops greatly depending on the installation position (environment) of the two wireless machines 4. Therefore, the estimation accuracy is sometimes low, when executing the processing (estimation processing) of estimating the optimum combination of each of the plurality of installation positions and each of the plurality of wireless machines 4 based on the RSSI (propagation characteristic) measured using one channel, for example.

However, even if the RSSI drops due to multipath fading in a specific channel, the RSSI can sometimes be measured without being affected by multipath fading in other channels having different wavelengths.

Therefore, the present embodiment is different from the first embodiment described above in that the optimum combination is estimated for each channel based on the RSSI measured using a plurality of channels.

FIG. 24 is a block diagram showing an example of a functional configuration of an electronic apparatus 10 according to the present embodiment. In the present embodiment, the electronic apparatus 10 includes estimation result storage 107. In the present embodiment, the estimation result storage 107 is implemented by the nonvolatile memory 12 shown in FIG. 6 described above, another storage device, or the like.

In the present embodiment, the propagation characteristic acquisition module 101 acquires characteristic information (hereinafter referred to as the characteristic information for each channel) including the propagation characteristics measured by the plurality of wireless machines 4 using each of the plurality of channels.

In the present embodiment, the estimation module 103 executes the estimation processing described in the first embodiment for each channel based on the characteristic information for each channel acquired by the propagation characteristic acquisition module 101.

A case where the estimation processing is executed for each of the two channels (hereinafter referred to as the first and second channels) will be described here.

In this case, the propagation characteristic acquisition module 101 acquires the characteristic information including the propagation characteristics (hereinafter referred to as the first propagation characteristic) measured by the plurality of wireless machines 4 using the first channel and the characteristic information including the propagation characteristics (hereinafter referred to as the second propagation characteristic) measured by the plurality of wireless machines 4 using the second channel.

First, the estimation module 103 executes the estimation processing for the first channel. Specifically, an optimum combination (first combination) is estimated using, as the early gene, the combination (first initial value) of each of the plurality of installation positions and each of the plurality of wireless machines 4 generated based on the arrangement of the plurality of installation positions based on the distance between the plurality of installation positions and the arrangement of the plurality of wireless machines 4 based on the first propagation characteristic.

In the present embodiment, the result (estimation result) of the estimation processing executed for the above-described first channel is stored (accumulated) in the estimation result storage 107.

Next, the estimation module 103 executes the estimation processing for the second channel. Specifically, the estimation module 103 estimates an optimum combination (second combination) using, as the early gene, the combination (second initial value) of each of the plurality of installation positions and each of the plurality of wireless machines 4 generated based on the arrangement of the plurality of installation positions based on the distance between the plurality of installation positions and the arrangement of the plurality of wireless machines 4 based on the second propagation characteristic, and the estimation result (result of the estimation processing executed for the first channel) stored in the estimation result storage 107.

Here, the case where the estimation processing is executed for each of the two channels (first and second channels) has been described, but the same applies to the case where the estimation processing is executed for each of three or more channels.

Although the operations of each of the plurality of wireless machines 4 and the electronic apparatus 10 will not be described in detail, in the present embodiment, the processing shown in FIG. 8 described in the above-described first embodiment is only required to be executed for each of the plurality of channels.

Here, in the present embodiment, it is necessary for the plurality of wireless machines 4 to measure the PSSI (propagation characteristic) using a plurality of channels, but when measuring the RSSI, it is necessary to switch the channels used by each of the plurality of wireless machines 4 so that the identical channel is used by the plurality of wireless machines 4 (i.e., measurement signals are transmitted and received between the plurality of wireless machines 4 using the identical channel).

An example of the processing of switching the channel used by the plurality of wireless machines 4 in the present embodiment will be described below with reference to FIG. 25.

In the present embodiment, an example of use of the Trickle algorithm as the communication protocol will be described. The Trickle algorithm is a communication protocol designed so that all wireless machines 4 (equipment) can have a common state. In this Trickle algorithm, a common interval is set among all the wireless machines 4.

A case where the channel used by the wireless machines D1 and D2 from among the plurality of wireless machines 4 is switched will be mainly described here, but it is possible to similarly switch as for the other wireless machines 4.

First, a master unit other than the plurality of wireless machines 4 for measuring the RSSI transmits, to the wireless machine D1, a channel change notification for instructing a channel change (step S31). This channel change notification includes a channel number indicating a channel (i.e., channel used to measure RSSI) to be changed in measurement of the RSSI, for example. The master unit that transmits the channel change notification may be the electronic apparatus 10 or the work terminal 6, or may be equipment different, from the electronic apparatus 10 and the work terminal 6.

The wireless machine D1 receives the channel change notification transmitted from the master unit. The wireless machine D1 transmits the channel change notification to the wireless machine D2 according to the interval set in the Tickle algorithm (step S32).

In the interval set next to the interval at which the channel change notification has been transmitted in step S32, the wireless machine D1 changes the channel to be used by the wireless machine D1 based on the channel number included in the channel change notification (step S33).

On the other hand, the wireless machine D2 receives the channel change notification transmitted from the wireless machine D1. The wireless machine D2 further transmits the channel change notification to another wireless machine 4 (e.g., wireless machine D3) according to the interval set in the Tickle algorithm (step S34).

In the interval set next to the interval at which the channel change notification has been transmitted in step S34, the wireless machine D2 changes the channel to be used by the wireless machine D2 based on the channel number included in the channel change notification (step S35).

In the present embodiment, by executing such processing, it becomes possible to switch the channel used by each of the plurality of wireless machines 4 to an identical channel (channel indicated by the channel number), and to transmit and receive measurement signals between the plurality of wireless machines 4 using the identical channel (i.e., to measure the RSSI using the channel).

Figure 25:
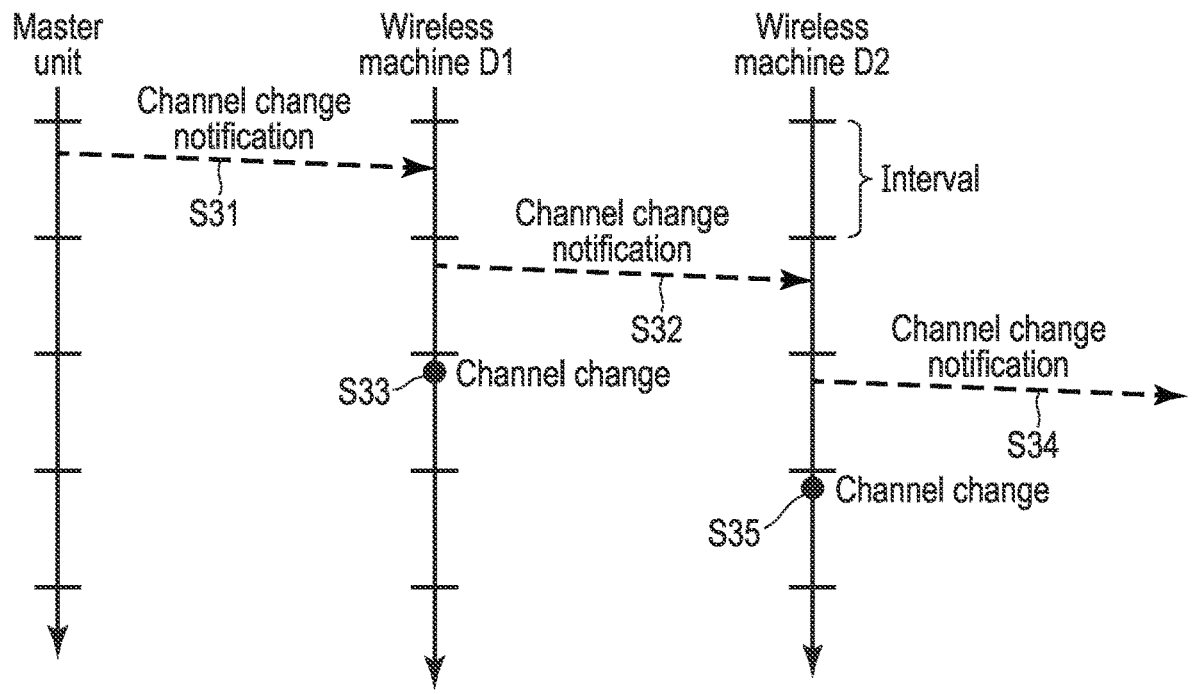
FIG. 25 is a view for explaining an example of processing of switching channels used in a plurality of wireless machines.

FIG. 25 describes that the channel change notification is to be sequentially transmitted to each of the plurality of wireless machines 4, but the channel change notification may be transmitted to the plurality of wireless machines 4 by broadcast.

As described, above, in the present embodiment, for example, in the case where the estimation processing of the optimum combination is executed for each of the first and second channels, by the configuration using the result of the estimation processing (i.e., estimation result) executed for the first channel as the early gene of the genetic algorithm when the estimation processing is executed for the second channel, it can be expected that the efficiency of the estimation processing for the second channel is improved more than in the case where only the early gene generated in the first embodiment is used.

Fourth Embodiment

Next, the fourth embodiment will be described. Note that in the present embodiment, parts similar to those in the drawings used in the description of the first embodiment described earlier are given the identical reference numerals for description. In the following description, parts different from those of the first embodiment described above will be mainly described.

The present embodiment is different from the above-described first embodiment in that, from among the combinations of each of the plurality of installation positions and each of the plurality of wireless machines 4, information (hereinafter referred to as confirmation information) indicating the correspondence relationship (combination) between at least one installation position and the wireless machine 4 confirmed by the worker, for example, is input by the worker.

Figure 26:
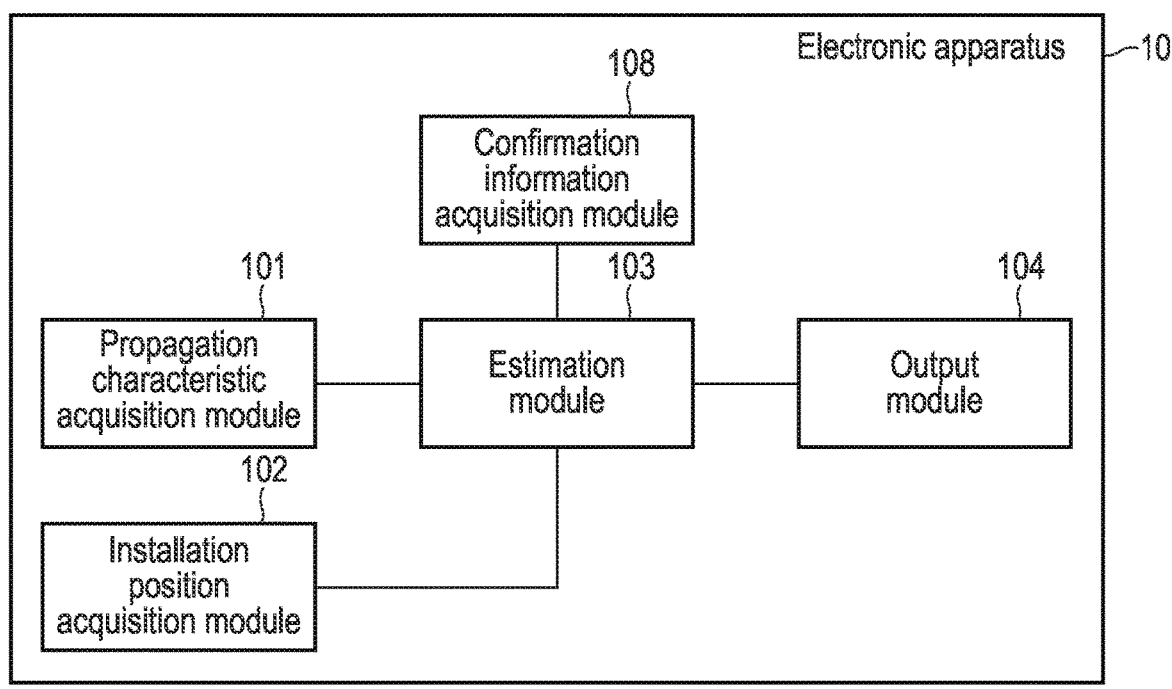
FIG. 26 is a block diagram showing an example of a functional configuration of an electronic apparatus according to a fourth embodiment.

FIG. 26 is a block diagram showing an example of a functional configuration of an electronic apparatus 10 according to the present embodiment. In the present embodiment, the electronic apparatus 10 includes a confirmation information acquisition module 108.

Note that the present embodiment assumes that the confirmation information acquisition module 108 is implemented by causing the CPU 11 shown in FIG. 6 described above to execute a program, i.e., by software. The confirmation information acquisition module 108 may be implemented by hardware, or may be implemented as a combination configuration of software and hardware.

In the present embodiment, in a case where, for example, the worker confirms at the site the wireless machine ID assigned to one wireless machine 4 installed at least one installation position, the confirmation information indicating the correspondence relationship between the (installation position ID assigned to the) installation position and the (wireless machine ID assigned to the) wireless machine 4 installed at the installation position is input in the work terminal 6. The confirmation information having been input in the work terminal 6 is transmitted to the electronic apparatus 10.

Thus, the confirmation information acquisition module 108 acquires (receives) the confirmation information having been input in the work terminal 6.

The estimation module 103 generates an early gene different from the early gene by reflecting the confirmation information acquired by the confirmation information acquisition module 108 onto the early gene of the genetic algorithm generated as described in the above-described first embodiment.

It is assumed here that one of the early genes generated by the estimation module 103 is a combination (hereinafter referred to as a target early gene) of "P1-D2, P2-D3, P3-D1, P4-D5, P5-D4" and the worker has confirmed that the wireless machine D5 is installed at the installation position P1 (i.e., confirmation information indicating the correspondence relationship between the installation position P5 and the wireless machine D1 is input into the work terminal 6).

In this case, the estimation module 103 rewrites the target early gene by reflecting the confirmation information onto the target early gene. Specifically, since the wireless machine D1 is installed at the installation position P1 according to the confirmation information, the correspondence relationship between the installation position P1 and the wireless machine D2 in the target early gene is changed to the correspondence relationship between the installation position P1 and the wireless machine D5, and the correspondence relationship between the installation position P4 and the wireless machine D5 is changed to the correspondence relationship between the installation position P4 and the wireless machine D2 (i.e., wireless machines D2 and D4 in the target, early gene are replaced).

According to this, the target early gene is rewritten from "P1-D2, P2-D3, P3-D1, P4-D5, P5-D4" to "P1-D5, P2-D3, P3-D1, P4-D2, P5-D4".

In the present embodiment, such rewrite processing is performed for all the early genes. Note that the rewrite processing may not be executed for the early gene that already includes (satisfies) the correspondence relationship between the installation position indicated and the wireless machine by the confirmation information. The correspondence relationship between the installation position and the wireless machine indicated by the confirmation information snail be treated as a settled combination (settled information) and shall not be changed, in the processing based on the genetic algorithm (i.e., excluded from the target of "crossover" and "mutation").

The operations of each of the plurality of wireless machines 4 and the electronic apparatus 10 in the present embodiment are the same as those in the first embodiment described above except that the confirmation information is acquired before the estimation processing (processing of generating an early gene) by the estimation module 103 as described above and the confirmation information is reflected on the early gene of the genetic algorithm. Hence, a detailed description thereof is omitted here.

As described above, in the present embodiment, by the configuration in which the confirmation information indicating the combination of at least one of the plurality of installation positions and at least one of the plurality of wireless machines 4 is acquired and the confirmation information is reflected on the early gene (i.e., generating early gene based on the confirmation information) of the genetic algorithm, the processing based on the genetic algorithm can be executed by using the early gene more coincident with the optimum combination (correct answer) to be estimated, and hence the optimum combination can be more efficiently estimated.

In the present embodiment, the description has been made on the assumption that the confirmation information is acquired before the estimation processing (generation processing of early gene) by the estimation module 103, but the confirmation information may be acquired while (i.e., during estimation) the processing based on the genetic algorithm is being executed. In this case, the confirmation information is only required to foe reflected on the gene (combination of each of the plurality of installation positions and each of the plurality of wireless machines 4) held during the execution of the processing based on the genetic algorithm.

According to at least one of the embodiments described above, it is possible to provide an electronic apparatus and a method capable of efficiently estimating the position where each of a plurality of wireless machine is installed.

While certain embodiments have been described, these embodiments have been presented by way of example only, and are not intended to limit the scope of the inventions. Indeed, the novel embodiments described herein may foe embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
a processor configured to:
acquire n positions where n devices are located, where n is an integer equal to or greater than 4;
receive a propagation characteristic acquired by wireless communication between a plurality of pairs of the devices; and
set a tentative correspondence between the devices and the positions based on the propagation characteristic; and
estimate the correspondence between the devices and the positions based on the propagation characteristic and an algorithm,
wherein
the algorithm includes a genetic algorithm that selectively executes evaluation, selection, crossover, and mutation on the tentative correspondence.

2. The electronic apparatus according to claim 1, wherein the tentative correspondence is set by distances between positions.

3. The electronic apparatus according to claim 2, wherein the distances are between edges of the positions.

4. The electronic apparatus according to claim 1, wherein the tentative correspondence is set based on distances between the the positions and the propagation characteristic depending on the distance.

5. The electronic apparatus according to claim 4, wherein the tentative correspondence includes a correspondence set by distances between a first device and second devices other than the first device, and a correspondence set by distances between a third device and fourth devices other than the third device.

6. The electronic apparatus according to claim 1, wherein the propagation characteristic includes a received signal strength indicator to be measured based on a signal transmitted and received between the devices.

7. The electronic apparatus according to claim 1, wherein mutation executed in the genetic algorithm reverses the tentative correspondence.

8. The electronic apparatus according to claim 1, wherein the processor is configured to:
acquire a correspondence between the devices and the positions;
compare the acquired correspondence with the estimated correspondence; and
output the compared result.

9. The electronic apparatus according to claim 8, wherein the acquired correspondence is used as an initial value for the algorithm.

10. The electronic apparatus according to claim 1, wherein
the propagation characteristic includes a first propagation characteristic measured by using a first channel and a second propagation characteristic measured by using a second channel, and
the processor is configured to:
estimate a first correspondence between the devices and the positions by using a first initial value generated based on a tentative correspondence set based on the first propagation characteristic, and
estimate a second correspondence between the devices and the positions by using a second initial value and the first correspondence, the second initial value being generated based on a tentative correspondence set based on the second propagation characteristic.

11. The electronic apparatus according to claim 1, wherein
the processor is configured to acquire a correspondence between at least one of the devices and at least one of the positions, and
an initial value of the algorithm is generated based on the acquired correspondence.

12. A method, comprising:
acquiring n positions where n devices are located, where n is an integer equal to or greater than 4;
receiving a propagation characteristic acquired by wireless communication between a plurality of pairs of the devices;

setting a tentative correspondence between the devices and the positions based on the propagation characteristic; and estimating the correspondence between the devices and the positions based on the propagation characteristic and an algorithm, wherein the algorithm includes a genetic algorithm that selectively executes evaluation, selection, crossover, and mutation on the tentative correspondence.

13. An electronic system, comprising:
an electronic apparatus including a processor; and
n devices, where n is an integer equal to or greater than 4,
wherein the processor is configured to:
acquire positions where the devices are located;
receive a propagation characteristic acquired by wireless communication between a plurality of pairs of the devices;
set a tentative correspondence between the devices and the positions based on the propagation characteristic; and
estimate the correspondence between the devices and the positions based on the propagation characteristic and an algorithm,
wherein the algorithm includes a genetic algorithm that selectively executes evaluation, selection, crossover, and mutation on the tentative correspondence.

\* \* \* \* \*